United States Patent
Arai et al.

(10) Patent No.: US 10,597,503 B2
(45) Date of Patent: Mar. 24, 2020

(54) PREPREG AND FIBER REINFORCED COMPOSITE MATERIAL

(71) Applicant: TORAY INDUSTRIES, INC., Tokyo (JP)

(72) Inventors: Atsuhito Arai, Ehime (JP); Koji Furukawa, Ehime (JP); Naofumi Yamashita, Ehime (JP); Shinji Kochi, Ehime (JP); Yumi Kunimitsu, Ehime (JP); Yui Fujioka, Ehime (JP); Hiroshi Taiko, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/128,583

(22) PCT Filed: Mar. 19, 2015

(86) PCT No.: PCT/JP2015/058236
§ 371 (c)(1),
(2) Date: Sep. 23, 2016

(87) PCT Pub. No.: WO2015/146781
PCT Pub. Date: Oct. 1, 2015

(65) Prior Publication Data
US 2017/0226299 A1    Aug. 10, 2017

(30) Foreign Application Priority Data

Mar. 24, 2014  (JP) ................................ 2014-059519

(51) Int. Cl.
| | | |
|---|---|---|
| *C08J 5/24* | (2006.01) | |
| *H01B 1/24* | (2006.01) | |
| *C08J 5/04* | (2006.01) | |
| *C08K 3/04* | (2006.01) | |
| *C08L 71/12* | (2006.01) | |
| *C08L 101/00* | (2006.01) | |
| *C08J 5/10* | (2006.01) | |
| *C08K 7/06* | (2006.01) | |

(52) U.S. Cl.
CPC ................ *C08J 5/24* (2013.01); *C08J 5/042* (2013.01); *C08J 5/10* (2013.01); *C08K 3/04* (2013.01); *C08K 7/06* (2013.01); *C08L 71/12* (2013.01); *C08L 101/00* (2013.01); *H01B 1/24* (2013.01); *C08J 2363/00* (2013.01); *C08J 2471/12* (2013.01); *C08J 2477/02* (2013.01); *C08J 2477/04* (2013.01); *C08K 2201/001* (2013.01)

(58) Field of Classification Search
CPC ....................................................... H01B 1/04
See application file for complete search history.

(56) References Cited

U.S. PATENT DOCUMENTS

| | | | | |
|---|---|---|---|---|
| 2001/0033984 | A1* | 10/2001 | Matsumura | .......... G03G 9/0804 430/110.4 |
| 2010/0178487 | A1* | 7/2010 | Arai | .......... C08J 5/24 428/300.1 |
| 2012/0056121 | A1* | 3/2012 | Karunaratne | .......... H01F 1/0054 252/62.56 |
| 2015/0183950 | A1* | 7/2015 | Wu | .......... C09C 1/56 524/496 |
| 2015/0184333 | A1* | 7/2015 | Arai | .......... C08G 59/38 428/327 |

FOREIGN PATENT DOCUMENTS

| | | |
|---|---|---|
| JP | 2004506789 | 3/2004 |
| JP | 2008231395 | 10/2008 |
| JP | 2010508416 | 3/2010 |
| JP | 2011144213 | 7/2011 |
| JP | 2011213991 | 10/2011 |
| JP | 2014141656 | 8/2014 |
| WO | 2012124450 | 9/2012 |
| WO | 2014017339 | 7/2016 |

OTHER PUBLICATIONS

Xu, R., et al, "Particle size and zeta potential of carbon black in liquid media," Carbon 45 (2007), 2806-2809.*
International Search Report and Written Opinion for International Application No. PCT/JP2015/058236, dated Jun. 16, 2015, 6 pages.
English language Written Opinion of the International Searching Authority for PCT/JP2015/058236, dated Jun. 16, 2015, 9 pages.

* cited by examiner

*Primary Examiner* — William D Young
(74) *Attorney, Agent, or Firm* — RatnerPrestia

(57) ABSTRACT

A prepreg containing at least the following components [A]-[F], wherein the ratio Ne/Nd of the number of structures Ne of component [F] present in a range of outside 110% of the particle diameter of component [E] and the number of structures Nd of component [F] present in a range outside 110% of the particle diameter of component [D] is 0.25 or higher. [A]: Carbon fibers, [B] thermosetting resin, [C]: curing agent, [D]: particles composed mainly of thermoplastic resin having a primary particle number-average particle size of 5-50 μm, [E]: conductive particles different from component [D] and having a primary particle number-average particle size in the range of a specific expression, [F]: filler comprising a carbon material.

10 Claims, No Drawings

PREPREG AND FIBER REINFORCED COMPOSITE MATERIAL

CROSS REFERENCE TO RELATED APPLICATIONS

This is the U.S. National Phase application of PCT/JP2015/058236, filed Mar. 19, 2015, which claims priority to Japanese Patent Application No. 2014-059519, filed Mar. 24, 2014, the disclosures of each of these applications being incorporated herein by reference in their entireties for all purposes.

FIELD OF THE INVENTION

The present invention relates to a prepreg to be used for obtaining a fiber reinforced composite material excellent in both impact resistance and thickness-direction conductivity, and a fiber reinforced composite material using this prepreg.

BACKGROUND OF THE INVENTION

Fiber reinforced composite materials composed of reinforcing fibers such as carbon fibers or glass fibers and a matrix resin such as an epoxy resin or phenol resin are lightweight and excellent in mechanical properties such as strength and stiffness, heat resistance and corrosion resistance, and therefore have been used in many fields such as aerospace, motor vehicles, rolling stock, ships, civil engineering & architecture, and sporting goods. Especially for applications requiring high performance, fiber reinforced composite materials using continuous reinforcing fibers are used; as reinforcing fibers, carbon fibers excellent in specific strength and specific modulus are popularly used, and as matrix resins, thermosetting resins, especially epoxy resins, which are excellent in adhesion to carbon fibers, are popularly used.

However, cured products of thermosetting resins such as epoxy resin are generally low in fracture toughness as compared with thermoplastic resins. This causes a problem that the impact resistance of the fiber reinforced composite material lowers. Especially in the case of structural members of aircrafts, since they are required to be excellent in impact resistance against such impacts as the drop of a tool during assembling and hail during flying, the enhancement of impact resistance has been a large issue.

Fiber reinforced composite materials generally have a layered structure, and if an impact is applied to it, a high stress acts between layers to cause cracking. For inhibiting cracking, it is effective to enhance the plastic deformability of an epoxy resin, and as a means for it, inclusion of a thermoplastic resin with excellent plastic deformability is available.

Such a technology, however, will result in forming a resin layer which serves as an insulating layer between layers whereas it will impart high impact resistance to fiber reinforced composite materials. Therefore, a disadvantage of that technology is that thickness-direction conductivity will lower, which is a kind of conductivity, which is a characteristic of fiber reinforced composite materials.

In recent years, great strides have been made in order to aim at achievement of both excellent impact resistance and excellent thickness-direction conductivity with a fiber reinforced composite material. For example, as disclosed in Patent Document 1 or 2, there is a method of disposing a reinforcement to enhance impact resistance and conductive particles to enhance thickness-direction conductivity in an interlayer section of a fiber reinforced composite material.

PATENT DOCUMENTS

Patent Document 1: JP 2008-231395 A
Patent Document 2: JP 2010-508416 W

SUMMARY OF THE INVENTION

However, the effect of enhancing thickness-direction conductivity attained by the technique disclosed in Patent Document 1 or 2 is not necessarily sufficient, and further improvement is awaited.

Moreover, depending upon the application or the site where a fiber reinforced composite material is applied, the carbon fiber areal weight, the fiber volume content, and others need to be adjusted appropriately according to the intended purpose. In such a case, without adjusting the size of the impact resistance reinforcement or the conductive particles, a desired thickness-direction resistance may not be attained, or physical properties may deteriorate due to failing to achieve a fiber volume content needed by applied members, or the mass of a member may increase.

As described above, it is necessary to obtain a fiber reinforced composite material with which excellent impact resistance and excellent thickness-direction conductivity are attained even if a carbon fiber areal weight or the like is changed according to the intended purpose.

An object of the present invention is to provide a prepreg from which a fiber reinforced composite material excellent in both impact resistance and thickness-direction conductivity can be obtained.

The present invention according to one aspect employs the following means in order to solve such problems. That is, a prepreg comprising at least the following components [A] to [F], wherein the ratio Ne/Nd of the number of structure Ne of component [F] present in a range of outside 110% of the particle diameter of component [E] to the number of structure Nd of component [F] present in a range of outside 110% of the particle diameter of component [D] is 0.25 or more,

[A]: carbon fibers
[B]: thermosetting resin
[C]: hardener
[D]: particles containing a thermoplastic resin having a primary particle number-average particle size of 5 to 50 μm as a primary component
[E]: conductive particles different from component [D] and having a primary particle number-average particle size in the range of the following formula (1)

$$[(A \times 0.1)+4] \leq P_{size} \leq [(A \times 0.1)+14] \quad \text{formula (1)}$$

$P_{size}$ a primary particle number-average particle size (μm) of component [E] conductive particles
A: areal weight (g/m²) of component [A] in the prepreg
[F]: filler comprising a carbon material.

According to one preferred embodiment of the present invention, at least one of the following formula (2) to formula (4) is satisfied, where the zeta-potential of the component [D] is expressed by ζd and the zeta-potential of the component [F] is expressed by ζf.

$$|\zeta d| < 10 \text{ mV} \quad \text{formula (2)}$$

$$|\zeta f| < 10 \text{ mV} \quad \text{formula (3)}$$

$$\zeta d \times \zeta f > 0 \text{ mV} \quad \text{formula (4)}$$

It becomes possible to provide a fiber reinforced composite material excellent in both impact resistance and thickness-direction conductivity by laying-up and curing prepregs of the present invention. Since the prepreg of the present invention is excellent in both impact resistance and thickness-direction conductivity for various carbon fiber areal weights, it can be widely employed for, for example, structural members of aircraft, blades of wind mills, outside plates of motor vehicles, computer applications as IC trays and notebook personal computer housings, and can greatly improve the performance of products applied.

DETAILED DESCRIPTION OF EMBODIMENTS OF THE INVENTION

The prepreg of embodiments of the present invention comprises at least the following components [A] to [F], and the ratio Ne/Nd of the number of structure Ne of component [F] present in a range of outside 110% of the particle diameter of component [E] to the number of structure Nd of component [F] present in a range of outside 110% of the particle diameter of component [D] is 0.25 or more,
[A]: carbon fibers
[B]: thermosetting resin
[C]: hardener
[D]: particles containing a thermoplastic resin having a primary particle number-average particle size of 5 to 50 μm as a primary component
[E]: conductive particles different from component [D] and having a primary particle number-average particle size in the range of the following formula (1)

$$[(A \times 0.1)+4] \leq P_{size} \leq [(A \times 0.1)+14] \quad \text{formula (1)}$$

$P_{size}$ a primary particle number-average particle size (μm) of component [E] conductive particles
A: areal weight (g/m²) of component [A] in the prepreg
[F]: filler comprising a carbon material.

Carbon fibers, which are the component [A] of the present invention, is superior in specific strength and specific modulus and has high conductivity, it is preferably used for applications which require excellent mechanical properties and high conductivity.

Specific examples of the carbon fibers of the component [A] include acrylic carbon fiber, pitch-based carbon fiber, and rayon-based carbon fiber, and acrylic carbon fiber, which is particularly high in tensile strength, is preferably used.

Such acrylic carbon fiber can be produced through, for example, a process as described below.

First, a spinning solution containing polyacrylonitrile produced from monomers containing acrylonitrile as a primary component is spun by wet spinning, dry-wet spinning, dry spinning, melt spinning or the like, and thus a coagulated thread is obtained. Then, the coagulated thread is subjected to a yarn-making step to provide a precursor. Subsequently, acrylic carbon fiber can be prepared by converting the precursor into carbon fiber via such steps as flameproofing and carbonization.

The carbon fibers of component [A] to be used may be in the form of twisted yarns, untwisted yarns, or twistless yarns. Twisted yarns will cause a decrease in mechanical characteristic of a resulting fiber reinforced composite material because the orientation of the filaments forming carbon fiber bundles is not parallel. For this reason, untwisted yarns or twistless yarns are preferably used, from fiber reinforced composite materials having moldability and strength characteristics in a good balance can be obtained.

The tensile modulus of the carbon fibers of component [A] is preferred 200-440 GPa. The tensile modulus of carbon fiber is influenced by the crystallinity of the graphite structure constituting the carbon fiber, and the elastic modulus is improved as the crystallinity becomes higher. Conductivity becomes also higher as the crystallinity becomes higher. It is preferred that the tensile modulus of the carbon fibers of the component [A] be within that range because the conductivity, the stiffness, and the strength of the fiber reinforced composite material are all balanced at a high level. The tensile modulus of more preferable carbon fibers is 230-400 GPa, and the tensile modulus of even more preferable carbon fibers is 260-370 GPa. In this description, the tensile modulus of carbon fibers is a value measured according to JIS R 7601-2006.

Examples of commercial products of carbon fibers which can be used as the component [A] include "TORAYCA (registered trademark)" T800S-24K, "TORAYCA (registered trademark)" T300-3K, and "TORAYCA (registered trademark)" T700S-12K (produced by Toray Industries, Inc.).

Although the thermosetting resin, which is the component [B] of the present invention, is not particularly limited, an epoxy resin is preferred. Especially, more preferred is an epoxy resin produced by reacting a compound having three or more epoxy groups and an aromatic ring, such as benzene and naphthalene, in one molecule. In the present invention, that the component [B] and the component [C] are "contained" includes not only the case that these are individually contained in an unreacted state but also the case that these are contained in a structure formed after these react partly or wholly.

Good examples of such an epoxy resin produced by reacting a compound having three or more epoxy groups and an aromatic ring, such as benzene and naphthalene, in one molecule include a glycidyl amine type epoxy resin and a glycidyl ether type epoxy resin. The number of functional groups is preferably 3 to 7, more preferably 3 to 5 because the cured matrix resin will be brittle and the impact resistance may be impaired if the number is excessively large.

Examples of the glycidylamine type epoxy resin include diaminodiphenylmethane type, diaminodiphenylsulfone type, aminophenol type, metaxylenediamine type, 1,3-bisaminomethylcyclohexane type, isocyanurate type, and hydantoin type epoxy resins. Among them, diaminodiphenylmethane type and aminophenol type epoxy resins are particularly preferably used due to their good balance of physical properties.

Examples of the glycidyl ether type epoxy resin include phenol novolac type, orthocresol novolac type, tris(hydroxyphenyl)methane type and tetraphenylolethane type epoxy resins.

These epoxy resins may be used singly or two or more thereof may be used in combination.

Containing an epoxy resin that exhibits fluidity at any arbitrary temperature and an epoxy resin that fails to exhibit fluidity at any arbitrary temperature is effective for fluidity control of the matrix resin during thermal curing of the resulting prepreg.

Combining two or more epoxy resins that exhibit various viscoelastic behaviors at arbitrary temperatures is effective to render the tackiness properties and the draping properties of a resulting prepreg appropriate.

In the present invention, a copolymer of the component [B] with a thermosetting resin, a modified form of the component [B], etc. may be contained in addition to the thermosetting resin of the component [B]. Moreover, an epoxy resin having mono-functionality or di-functionality may also be contained.

In the case of containing a copolymer of the component [B] and a thermosetting resin, examples of the thermosetting resin to be copolymerized when the component [B] is an epoxy resin include an unsaturated polyester resin, a vinyl ester resin, an epoxy resin, a benzoxazine resin, a phenol resin, an urea resin, a melamine-formaldehyde resin, and a polyimide resin. These resins may be used singly or two or more thereof may be used in combination.

In embodiments of the present invention, inclusion of an epoxy resin having mono-functionality or an epoxy resin having di-functionality in addition to the thermosetting resin of the component [B] readily assists establishment of both fluidity of a resin and heat resistance after curing.

Especially, the combination of a glycidyl amine type epoxy resin and a glycidyl ether type epoxy resin enables coexistence of heat resistance and water resistance with produce ability.

Moreover, inclusion of at least one epoxy resin that is in a liquid state at normal temperature and at least one epoxy resin that is in a solid state at normal temperature readily renders the tackiness properties and the draping properties of a prepreg appropriate.

As the epoxy resin having di-functionality, a glycidyl ether type epoxy resin prepared using a phenol as a precursor is preferably used. Examples of such an epoxy resin include bisphenol A type epoxy resin, bisphenol F type epoxy resin, bisphenol S type epoxy resin, naphthalene type epoxy resin, biphenyl type epoxy resin, urethane-modified epoxy resin, and resorcinol type epoxy resin.

It is preferred to use a liquid bisphenol A type epoxy resin, bisphenol F type epoxy resin, or resorcinol type epoxy resin in combination with another epoxy resin because the liquid resin is low in viscosity.

Further, a solid bisphenol A type epoxy resin gives a structure with a low crosslinking density compared with the aforementioned liquid bisphenol A type epoxy resin, and consequently lowers the heat resistance. However, it is preferably used in combination with a glycidylamine type epoxy resin, liquid bisphenol A type epoxy resin or bisphenol F type epoxy resin because a structure with higher toughness is readily obtained.

An epoxy resin having a naphthalene skeleton gives a cured resin with a low water absorption coefficient and high heat resistance. Further, biphenyl type epoxy resin, dicyclopentadiene type epoxy resin, phenolaralkyl type epoxy resin, and diphenylfluorene type epoxy resin can also be used suitably because they give cured resins with a low water absorption coefficient. Urethane-modified epoxy resin and isocyanate-modified epoxy resin give cured resins with high fracture toughness and high elongation.

Examples of commercially available products of the bisphenol A type epoxy resin include "jER (registered trademark)" 825 (produced by Mitsubishi Chemical Corporation), "Epototo (registered trademark)" YD-128 (produced by Tohto Kasei Co., Ltd.), DER-331 and DER-332 (produced by The Dow Chemical Company).

Examples of commercially available products of the bisphenol F type epoxy resin include "jER (registered trademark)" 806, "jER (registered trademark)" 807 and "jER (registered trademark)" 1750 (produced by Mitsubishi Chemical Corporation), "EPICLON (registered trademark)" 830 (produced by DIC Corporation), and "Epototo (registered trademark)" YD-170 (produced by Tohto Kasei Co., Ltd.).

Examples of commercially available products of the resorcinol type epoxy resin include "Denacol (registered trademark)" EX-201 (produced by Nagase ChemteX Corporation).

Examples of commercially available products of the diaminodiphenylmethane type epoxy resin include ELM434 (produced by Sumitomo Chemical Co., Ltd.), "Araldite (registered trademark)" MY720, "Araldite (registered trademark)" MY721, "Araldite (registered trademark)" MY9512, "Araldite (registered trademark)" MY9663 (produced by Huntsman Advanced Materials), and "Epototo (registered trademark)" YH-434 (produced by Tohto Kasei Co., Ltd.).

Examples of commercially available products of the metaxylenediamine type epoxy resin include "TETRAD (registered trademark)"-X (produced by Mitsubishi Gas Chemical Co., Inc.).

Examples of commercially available products of the 1,3-bisaminomethylcyclohexane type epoxy resin include "TETRAD (registered trademark)"-C (produced by Mitsubishi Gas Chemical Co., Inc.).

Examples of commercially available products of the isocyanurate type epoxy resin include "TEPIC (registered trademark)"-P (produced by Nissan Chemical Industries, Ltd.)

Examples of commercially available products of the tris(hydroxyphenyl)methane type epoxy resin include "TACTIX (registered trademark)" 742 (produced by Huntsman Advanced Materials).

Examples of commercially available products of the tetraphenylolethane type epoxy resin include "jER (registered trademark)" 1031S (produced by Mitsubishi Chemical Corporation).

Examples of commercially available products of the aminophenol type epoxy resin include ELM120 and ELM100 (produced by Sumitomo Chemical Co., Ltd.), "jER (registered trademark)" 630 (produced by Mitsubishi Chemical Corporation), and "Araldite (registered trademark)" MY0510 (produced by Huntsman Advanced Materials), and "Araldite (registered trademark)" MY0600 (produced by Huntsman Advanced Materials).

Examples of commercially available products of the tetraglycidyldiaminodiphenylsulfone type epoxy resin include TG3DAS (produced by Mitsui Fine Chemicals, Inc.).

Examples of commercially available products of the glycidylaniline type epoxy resin include GAN and GOT (produced by Nippon Kayaku Co., Ltd.).

Examples of commercially available products of the biphenyl type epoxy resin include NC-3000 (produced by Nippon Kayaku Co., Ltd.).

Examples of commercially available products of the dicyclopentadiene type epoxy resin include "EPICLON (registered trademark)" HP7200 (produced by DIC Corporation).

Examples of commercially available products of the urethane-modified epoxy resin include AER4152 (produced by Asahi Kasei Epoxy Co., Ltd.).

Examples of commercially available products of the phenol novolac type epoxy resin include DEN431 and DEN438 (produced by The Dow Chemical Company) and "jER (registered trademark)" 152 (produced by Mitsubishi Chemical Corporation).

Examples of commercially available products of the orthocresol novolac type epoxy resin include EOCN-1020 (produced by Nippon Kayaku Co., Ltd.) and "EPICLON (registered trademark)" N-660 (produced by DIC Corporation).

Examples of commercially available products of the hydantoin type epoxy resin include AY238 (produced by Huntsman Advanced Materials).

The hardener of the component [C] of the present invention is used as a hardener for heat-curing the thermosetting resin of the component [B]. As such a hardener, an aromatic amine is preferably used. Examples of the aromatic amine compound include 3,3'-diisopropyl-4,4'-diaminodiphenylmethane, 3,3'-di-t-butyl-4,4'-diaminodiphenylmethane, 3,3'-diethyl-5,5'-dimethyl-4,4'-diaminodiphenylmethane, 3,3'-diisopropyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'-diaminodiphenylmethane, 3,3'-di-t-butyl-5,5'-diethyl-4,4'-diaminodiphenylmethane, 3,3',5,5'-tetraisopropyl-4,4'-diaminodiphenylmethane, 3,3'-di-t-butyl-5,5'-diisopropyl-4,4'-diaminodiphenylmethane, 3,3',5,5'-tetra-t-butyl-4,4'-diaminodiphenylmethane, 4,4'-diaminodiphenylmethane, 4,4'-diaminodiphenylsulfone, 3,3'-diaminodiphenylsulfone, m-phenylenediamine, m-xylylenediamine, and diethyltoluenediamine, etc. are mentioned. Especially, in the case of aerospacecraft applications, etc., it is preferred to use 4,4'-diaminodiphenylsulfone and 3,3'-diaminodiphenylsulfone, which will afford cured products that are excellent in heat resistance and elastic modulus and also are small in coefficient of linear expansion and exhibit small decrease in heat resistance caused by moisture absorption. Such aromatic amine compounds may be used singly or two or more thereof may be used in combination. These may be in either a powder form or a liquid form at the time of being mixed with other components, and a powdery aromatic amine compound and a liquid aromatic amine compound may be mixed in use.

Examples of commercially available products of the aromatic amine compound include "SEIKACURE (registered trademark)" S (produced by Seika Corporation), MDA-220 (produced by Mitsui Chemicals, Inc.), "LONZACURE (registered trademark)" M-DIPA (produced by Lonza Ltd.), "LONZACURE (registered trademark)" M-MIPA (produced by Lonza Ltd.), and 3,3'-DAS (produced by Mitsui Chemicals, Inc.).

Regarding the content in the case where an aromatic amine is used as the component [C], the number of moles of the active hydrogen of the aromatic amine compound is preferably adjusted to 0.6 to 1.2 times, more preferably 0.8 to 1.1 times the number of moles of the epoxy groups of the entire epoxy resin in the resin composition containing the component [B], from the viewpoints of heat resistance and mechanical characteristics. When being less than 0.6 times, the resulting cured product may fail to have a sufficiently high cross-linking density, leading to lack of elastic modulus and heat resistance, and the resulting fiber reinforced composite material may be insufficient in static strength characteristics. When being greater than 1.2 times, a cured product becomes high in cross-linking density to lower in plastic deformation capacity and, as a result, the impact resistance of a fiber composite material may be poor.

When using an aromatic amine compound as the component [C] of the present invention, a cross-linking reaction is generally known to progress slowly. Accordingly, the aromatic amine compound may contain a cure accelerator in order to promote the reaction in the present invention. Examples of such a cure accelerator include tertiary amines, Lewis acid complexes, onium salts, imidazole compounds, and urea compounds. The content of the cure accelerator, which needs to be adjusted appropriately depending upon the type of the cure accelerator to be used, is 10 parts by mass or less, preferably 5 parts by mass or less, relative to 100 parts by mass of all the epoxy resins. When the cure accelerator is contained in an amount within such a range, this is favorable because temperature variation hardly occurs in molding the fiber reinforced composite material.

The particles of the component [D] of an embodiment of the present invention, which contain a thermoplastic resin as a primary component and contain primary particles having a number-average particle size of 5 to 50 μm, are contained in order to impart impact resistance to the fiber reinforced composite material of the present invention. In the present invention, "to contain a thermoplastic resin as a primary component" means to contain the thermoplastic resin in an amount of 50% by mass or more.

Generally, the fiber reinforced composite material has a laminated structure. If an impact acts on this, a high stress occurs between layers to cause delamination damage. Therefore, a conceivable way to improve the impact resistance against external impact is to enhance the toughness of a resin layer formed between layers made of the component [A] of the fiber reinforced composite material (this may hereinafter also be referred to as "interlayer resin layer").

As the thermoplastic resin that is the primary component of the component [D] of the present invention, polyamides and polyimides can be used preferably. Especially, polyamides are more preferable because impact resistance can be improved greatly due to their excellent toughness. Among polyamides, nylon 6, nylon 12, nylon 11, and a nylon 6/12 copolymer are even more preferable because these provide particularly good bonding strength with a thermosetting resin.

Examples of commercially available products of the polyamide include SP500 (produced by Toray Industries, Inc.), "Toraypearl (registered trademark)" TN (produced by Toray Industries, Inc.), "Orgasol (registered trademark)" 1002D (produced by Arkema), "Orgasol (registered trademark)" 2002 (produced by Arkema), and "Orgasol (registered trademark)" 3202 (produced by Arkema).

The component [D] of the present invention may be particles containing only the thermoplastic resin described above, but solvent resistance may become a problem in that case. When a fiber reinforced composite material is used as a structural member or an outside plate, painting may be applied to the surface thereof, and when it is used for an aircraft application, an automotive application, etc., it may be exposed to a hydraulic oil or a fuel. The particles containing only the thermoplastic resin described above may be swollen and degraded by such chemicals, deteriorating in performance.

One means for improving the chemical resistance of such a thermoplastic resin is a method of containing a small amount of a thermosetting resin. In this case, the straight chain structure of the thermoplastic resin is incorporated into the three-dimensional network structure formed by the thermosetting resin to form a semi IPN structure, which is an interpenetrating type network structure, and as the result, the solvent resistance significantly improves.

The component [D] of the present invention preferably has formed such a semi IPN structure. In order to develop solvent resistance and impact resistance, the content ratio of the thermoplastic resin and the thermosetting resin (thermoplastic resin:thermosetting resin, mass ratio) of the particles of the component [D] containing particles containing a thermoplastic resin as a primary component is preferably within the range of 95:5 to 70:30, more preferably within the range of 90:10 to 80:20.

Examples of such thermosetting resin include unsaturated polyester resins, vinyl ester resins, epoxy resins, benzoxazine resins, phenol resins, urea resins, melamine formaldehyde resins and polyimide resins. Among these, epoxy resins are preferable because they are of the same type as the component [B], which is the primary component of the matrix resin of embodiments of the present invention, and they can be used without causing decrease in mechanical properties.

In order to selectively toughen the interlayer resin layer of the fiber reinforced composite material according to aspects of the present invention, it is necessary to hold the component [D] in the interlayer resin layer. For this reason, the number-average particle size of the component [D] is within the range of 5 to 50 μm, preferably within the range of 7 to 40 μm, even more preferably within the range of 10 to 30 μm. By adjusting the number-average particle size to 5 μm or more, the particles of the component [D] are prevented from intruding into bundles of the carbon fibers of the component [A] and can stay in the interlayer resin layer of a resulting fiber reinforced composite material. Moreover, by adjusting the number-average particle size to 50 μm or less, the thickness of the matrix resin layer at the prepreg surface can be tuned and, as result, the volume content of the carbon fibers of the component [A] in a resulting fiber reinforced composite material can be tuned.

Here, as to the number-average particle size of the component [D] as a raw material, there is used as described below a value determined by magnifying and observing the component [D] by a laser microscope (color 3D profile microscope VK-9510; manufactured by KEYENCE CORP.), and, for 60 arbitrary particles, measuring the diameter of a circumscribed circle of each particle as its size, and averaging the measurements.

As the number-average particle size of the component [D] in the prepreg, there is used as described below a value determined by magnifying a cross section of the prepreg by an epi-illumination type optical microscope at a magnification of ×200, photographing at five points, and then measuring the particle diameter of 60 particles of the component [D] from the cross-sectional photograph obtained, and averaging the measurements.

The shape of the particles containing a thermoplastic resin as a primary component, namely the component [D] of the present invention, may be in any of an amorphous, spherical, porous, acicular, whiskery, and flaky forms. Among these, a spherical form is preferred. Because of being in a spherical form, degradation of flow properties of the matrix resin is prevented and thus good carbon fiber impregnating property is exhibited, and since delamination occurring from local impact at the time of drop impact to a fiber reinforced composite material is reduced, there are fewer delaminated parts caused by the local impact, the parts being to serve as the starting point of failure due to the stress concentration, when a stress is applied to a fiber reinforced composite material after that impact; for these reasons, it becomes easy to obtain a fiber reinforced composite material that develops high impact resistance.

The content of the particles containing a thermoplastic resin as a primary component of the component [D] of the present invention is preferably within a range of 10 to 35 parts by mass, preferably within a range of 15 to 25 parts by mass, relative to 100 parts by mass of the component [B]. Adjusting the content of the thermoplastic resin in such a range ensures a good balance among the viscosity of the mixture, tackiness of the resulting prepreg, and the mechanical properties of the resulting fiber reinforced composite material.

The components [E] and [F] of the present invention are contained in order to enhance the thickness-direction conductivity of the fiber reinforced composite material of the present invention.

The fiber reinforced composite material of the present invention has been selectively toughened and enhanced in impact resistance by disposing the component [D] in the interlayer resin layer as previously described. However, since such a fiber reinforced composite material imparts high impact resistance to the fiber reinforced composite material, but it has a disadvantage of greatly reducing the thickness-direction conductivity of a resulting fiber reinforced composite material because a resin layer which will act as an insulating layer is formed between layers.

Accordingly, conductive particles of the component [E] of the present invention are contained in order to enhance the conductivity of the interlayer resin layer of the fiber reinforced composite material. Such conductive particles should just be particles which behave as good electrical conductor and are not limited to be composed of only a conductor.

The volume resistivity of the conductive particles of the component [E] is preferably 10 Ωcm or less, more preferably 5 Ωcm or less, and even more preferably 3 Ωcm or less. Adjusting the volume resistivity to such a range makes it possible to form conductive paths in an interlayer resin layer and enhance the thickness-direction conductivity. Here, the volume resistivity is a value determined by setting a sample in a cylindrical cell equipped with a 4-probe electrode, then measuring the thickness and a resistance of the sample while applying a pressure of 60 MPa to the sample, and calculating the volume resistivity from the measurements.

Specific examples of such conductive particles which can be used include metal particles, conductive polymer particles such as polyacetylene particles, polyaniline particles, polypyrrole particles, polythiophene particles, polyisothianaphthene particles and polyethylenedioxythiophene particles, as well as particles in which inorganic material cores are coated with a conductive substance, and particles in which organic material cores are coated with a conductive substance. Among these, carbon particles, particles in which inorganic material cores are coated with a conductive substance, and particles in which organic material cores are coated with a conductive substance are preferably used because these exhibit high conductivity and high safety, and carbon particles are particularly preferably used because they are cheaply available.

When the conductive particles are particles in which cores made of an inorganic material are coated with a conductive substance, examples of the inorganic material of the cores include inorganic oxides, inorganic-organic composite materials, and carbon.

Examples of the inorganic oxides to be used as the inorganic material of the cores include individual inorganic oxides and composite inorganic oxides composed of two or more inorganic oxides, such as silica, alumina, zirconia, titania, silica-alumina and silica-zirconia.

Examples of the inorganic-organic composite materials to be used as the inorganic material of the cores include polyorganosiloxanes produced by hydrolyzing a metal alkoxide and/or a metal alkylalkoxide.

As the carbon to be used for the inorganic material of the cores, crystalline material carbon and amorphous carbon are preferably used. Specific examples of the amorphous carbon include "BELLPEARL (registered trademark)" C-600, C-800 and C-2000 (produced by Air Water Inc.); "NICA-BEADS (registered trademark)" ICB, PC and MC (produced by Nippon Carbon Co., Ltd.); Glassy Carbon (produced by Tokai Carbon Co., Ltd.); high-purity artificial graphite SG Series, SGB Series and SN Series (produced by SEC Carbon, Ltd.); and spherical carbon (produced by GUN EI Chemical Industry Co., Ltd.).

When the conductive particles are particles in which cores of an organic material are coated with a conductive substance, examples of the organic material of the cores include thermosetting resins such as unsaturated polyester resins, vinylester resins, epoxy resins, benzoxazine resins, phenol resins, urea resins, melamine-formaldehyde resins and polyimide resins, and thermoplastic resins such as polyamide resins, phenol resins, amino resins, acrylic resins, ethylene-polyvinyl acetate resins, polyester resins, urea resins, melamine-formaldehyde resins, alkyd resins, polyimide resins, urethane resins and divinylbenzene resins; these organic materials may be used singly or a plurality of them may be used in combination. Especially, acrylic resins and divinylbenzene resins, which have excellent heat resistance, and polyamide resins, which have excellent impact resistance, are preferably used.

The conductive particles of the component [E] according to aspects of the present invention is required to be localized in an interlayer resin layer of the fiber reinforced composite material of the present invention in order to enhance the conductivity of the interlayer resin layer. In the fiber reinforced composite material, no conductive paths are formed and the effect of improving conductivity is deteriorated if the component [A] and the conductive particles of the component [E] located in the top part and the bottom part of the interlayer resin layer are not in contact with each other. For this reason, it is necessary to adjust the number-average particle size of the conductive particles of the component [E] into a specific range.

Generally, however, in order to use a fiber reinforced composite material as a member of an aircraft, a car, or the like, it is necessary to adjust the areal weight (mass per unit area) of the carbon fibers of the component [A] in a prepreg according to the application site and the intended purpose. When the carbon fiber areal weight is changed, it is necessary to adjust the thickness of the interlayer resin layer in order to make the volume content of the carbon fibers in a resulting fiber reinforced composite material uniform. For this reason, it is necessary to change the number-average particle size of the conductive particles of the component [E] of embodiments of the present invention according to the areal weight of the carbon fiber of the component [A].

Accordingly, in embodiments of the present invention, the range of the number-average particle size of the conductive particles of the component [E] is adjusted by the following formula (1).

$$[(A \times 0.1)+4] \leq P_{size} \leq [(A \times 0.1)+14] \quad \text{formula (1)}$$

$P_{size}$ a primary particle number-average particle size (μm) of component [E] conductive particles A: areal weight (g/m²) of component [A] in the prepreg Adjusting the number-average particle size of the component [E] to the range of formula (1) makes it possible to form appropriate conductive paths according to the areal weight of the carbon fibers of the component [A] in the prepreg and bring the volume content of the carbon fibers in a resulting fiber reinforced composite material into a prescribed range.

Here, as to the number-average particle size of the component [E] as a raw material, there is used as described below a value determined by magnifying and observing the component [E] by a laser microscope (color 3D profile microscope VK-9510; manufactured by KEYENCE CORP.), and, for 60 arbitrary particles, measuring the diameter of a circumscribed circle of each particle as its particle size, and averaging the measurements.

As the number-average particle size of the component [E] in the prepreg, there is used as described below a value determined by magnifying a cross section of the prepreg by an epi-illumination type optical microscope at a magnification of ×200, photographing at five points, and then measuring the particle diameter of 60 particles of the component [E] from the cross-sectional photograph obtained, and averaging the measurements.

The content of the conductive particles of the component [E] of the present invention is preferably within the range of 0.5 to 15 parts by mass, more preferably within the range of 1 to 8 parts by mass, even more preferably within the range of 2 to 5 parts by mass, relative to 100 parts by mass of the component [B]. Bringing the content of the conductive particles within such a range can balance the thickness-direction conductivity and the mechanical properties of the resulting fiber reinforced composite material.

In the fiber reinforced composite material of embodiments of the present invention, conductive particles of the component [E] are disposed in the interlayer resin layer of the fiber reinforced composite material as previously described, and thereby the interlayer resin layer, which was an insulating layer, is improved and the thickness-direction conductivity of the fiber reinforced composite material is improved. However, if some of the conductive particles of the component [E] are in insufficient contact with carbon fiber bundles located in parts below and above the interlayer resin layer, no conductive paths are formed and the effect of improving conductivity can be decreased. Moreover, also in the inside of a bundle formed of the component [A], the conductivity can decrease because an electric current is hardly allowed to pass if the component [A] itself is in poor contact.

Then, in order to solve this problem, a filler comprising a carbon material, which is the component [F] of the present invention, is contained.

There are no particular limitations on the filler made of a carbon material and examples thereof include carbon nanofiber, carbon nanohorn, carbon nanocone, carbon nanotube, carbon nanocoil, carbon microcoil, carbon nanowall, carbon nanochaplet, fullerene, carbon black, graphite, graphene, carbon nanoflake, and derivatives thereof. These carbon-based fillers may be used individually, or two or more thereof may be used in combination. Among such fillers comprising a carbon material, carbon black, which is low in price and has a high effect of imparting conductivity, is preferable from the overall aspect including supply, price, and effect of imparting conductivity.

Generally, carbon black is a carbon-based particle produced while controlling the number-average particle size in a primary particle state to between 3 and 500 nm. Examples of such carbon black include furnace black, hollow furnace black, acetylene black, and channel black.

In the case of having been dispersed in the component [B], carbon black usually forms a structure in which a plurality of primary particles are linked. Although carbon black, which is likely to form a big structure, is believed to be excellent in electrical conductivity, if a structure is excessively large, it cannot intrude to between bundles composed of the component [A] or into gaps between bundles composed of the component [A] in defective contact and conductive particles of the component [E]. For the reason described above, the size of the structure of the component [F] of the present invention is preferably within the range of 40 to 500 nm in terms of number-average particle size, more preferably within the range of 50 to 400 nm, even more preferably within the range of 60 to 300 nm. Adjusting the size of the structure of carbon black to such a range makes it possible to allow the component [A] itself, and the bundles of the component [A] and the conductive particles of the component [E] to link together to form conductive paths and, as a result, it can dramatically improve the thickness-direction conductivity of a resulting fiber reinforced composite material.

Here, as to the size of the structure of carbon black, a value obtained by the following method is used as described below. That is, carbon black was dispersed in the component [B], and then a hardener of the component [C] was incorporated. Then, the mixture was poured into a prescribed form and the temperature was raised from room temperature to a temperature of 180° C. at a rate of 1.5° C. per minute in a hot-air oven and then was held at a temperature of 180° C. for 2 hours. Thus, a 2 mm-thick cured resin plate was obtained. The cured plate obtained is sectioned with a microtome and observed by a transmission electron microscope (TEM), and for 60 arbitrary structures, the length of the longest part is measured as a particle size and a value obtained by averaging the particle sizes is used.

The content of the component [F] of the present invention is preferably within the range of 0.5 to 15 parts by mass relative to 100 parts by mass of the component [B], more preferably within the range of 1 to 10 parts by mass, even more preferably within the range of 2 to 7 parts by mass. By adjusting the content of the component [F] to such a range, it is possible to balance the thickness-direction conductivity and the mechanical properties of a resulting fiber reinforced composite material.

The prepreg of the present invention can contain a thermoplastic resin soluble in an epoxy resin to be used preferably as the component [B], organic particles such as rubber particles and thermoplastic resin particles, inorganic particles, etc. in order to improve the tackiness or draping characteristics of a prepreg or mechanical characteristics such as impact resistance of a fiber reinforced composite material.

One of preferable examples of the thermoplastic resin soluble in the epoxy resin is a thermoplastic resin having hydrogen bondable functional groups because this is expected to have an effect of improving adhesiveness between resin and reinforcing fibers. Examples of the hydrogen bondable functional group include an alcoholic hydroxy group, an amide linkage, a sulfonyl group, and a carboxyl group.

Examples of the thermoplastic resin having an alcoholic hydroxyl group include polyvinyl acetal resins, such as polyvinyl formal and polyvinyl butyral, polyvinyl alcohol, and phenoxy resins.

Examples of the thermoplastic resin having amide linkages include polyamides, polyimides, polyamideimides, and polyvinylpyrrolidone.

Examples of the thermoplastic resin having sulfonyl groups include polysulfones and polyethersulfones.

Examples of the thermoplastic resin having carboxyl groups include polyesters, polyamides, and polyamideimides.

Among the above, the polyamides, the polyimides and the polysulfones may have functional groups such as ether linkages and carbonyl groups in the main chains. The polyamides may have substituents on the nitrogen atoms of amide groups.

Examples of commercially available products of a thermoplastic resin soluble in an epoxy resin and having a hydrogen bondable functional group include Denka Butyral (produced by Denki Kagaku Kogyo K.K.) in terms of a polyvinyl acetal resin, Denka Poval (registered trademark) (produced by Denki Kagaku Kogyo K.K.) and "Vinylec (registered trademark)" (produced by Chisso Corporation) in terms of a polyvinyl alcohol resin, "Macromelt (registered trademark)" (produced by Henkel Corporation), and "Amilan (registered trademark)" CM4000 (produced by Toray Industries, Inc.) in terms of a polyamide resin, "Ultem (registered trademark)" (produced by SABIC Innovative Plastics), "AURUM (registered trademark)" (produced by Mitsui Chemicals, Inc.), and "Vespel (registered trademark)" (produced by Du Pont Kabushiki Kaisha) in terms of polyimide, "Victrex (registered trademark)" (produced by Victrex plc) in terms of a PEEK polymer, "UDEL (registered trademark)" (produced by Solvay Advanced Polymers, LLC) in terms of polysulfone; and "Luviskol (registered trademark)" (produced by BASF Japan Ltd.) in terms of polyvinylpyrrolidone.

Another preferable example of the thermoplastic resin soluble in an epoxy resin is acrylic resin. The acrylic resin has high compatibility with an epoxy resin and it is preferably used for viscoelasticity control. Examples of commercially available products of the acrylic resin include "Dianal (registered trademark)" BR series (produced by Mitsubishi Rayon Co., Ltd.) and "Matsumoto Microsphere (registered trademark)" M, M100 and M500 (produced by Matsumoto Yushi-Seiyaku Co., Ltd.).

Still another preferable example of the thermoplastic resin soluble in an epoxy resin is a thermoplastic resin composed of a polyaryl ether skeleton, which is a preferable component [G] of the present invention. Using the thermoplastic resin composed of a polyaryl ether skeleton as the component [G] makes it possible to control the tackiness of a resulting prepreg, control the fluidity of a matrix resin when heat-curing a prepreg, and impart toughness to a resulting fiber reinforced composite material without impairing the heat resistance or the elastic modulus thereof.

Examples of such a thermoplastic resin composed of a polyaryl ether skeleton include polysulfone, polyphenyl sulfone, polyethersulfone, polyetherimide, polyphenylene ether, polyetheretherketone, and polyether ether sulfone, and such thermoplastic resins composed of a polyaryl ether skeleton may be used singly or two or more of them may be used.

Especially, in order to obtain good heat resistance, the glass transition temperature (Tg) of the thermoplastic resin composed of a polyaryl ether skeleton of the component [G] is preferably at least 150° C. or higher, more preferably 170° C. or higher. If the glass transition temperature of the thermoplastic resin composed of a polyaryl ether skeleton is lower than 150° C., the molded article obtained may be likely to be deformed by heat when it is used.

Since the terminal functional group of the thermoplastic resin composed of a polyaryl ether skeleton can react with a cation-polymerizable compound, a hydroxy group, a carboxyl group, a thiol group, an acid anhydride, etc. are preferred. As commercially available products of such a thermoplastic resin composed of a polyaryl ether skeleton having a terminal functional group, there can be used "SUMIKAEXEL (registered trademark)" PES3600P, "SUMIKAEXEL (registered trademark)" PES5003P, "SUMIKAEXEL (registered trademark)" PES5200P, "SUMIKAEXEL (registered trademark)" PES7200P (produced by Sumitomo Chemical Co., Ltd.), "Virantage (registered trademark)" VW-10200RFP, "Virantage (registered trademark)" VW-10700RFP (produced by Solvay Advanced Polymers), and Copolymer oligomers of polyether sulfone and polyether ether sulfone such as those disclosed in JP 2004-506789 W, as well as "ULTEM (registered trademark)" 1000, "ULTEM (registered trademark)" 1010, and "ULTEM (registered trademark)" 1040 (produced by SABIC), which are commercially available products of polyether imide, can be enumerated. In the present invention, an oligomer refers to a polymer with a relatively low molecular weight in which a finite number of about 10 to about 100 monomer molecules are bonded to each other.

The content of the thermoplastic resin composed of a polyaryl ether skeleton, which is a preferable component [G] of the present invention, is preferably in the range of 5 to 40 parts by mass, more preferably in the range of 10 to 35 parts by mass, and still more preferably 15 to 30 parts by mass, relative to 100 parts by mass of component [B]. Adjusting the content of the thermoplastic resin in such a range ensures a good balance among the viscosity of the mixture, tackiness of the resulting prepreg, and the mechanical properties of the resulting fiber reinforced composite material.

As the rubber particles to be added in order to improve the tackiness and draping characteristics of the prepreg of the present invention and the mechanical characteristics such as impact resistance of a fiber reinforced composite material, cross-linked rubber particles and core-shell rubber particles having a dissimilar polymer graft-polymerized on the surfaces of crosslinked rubber particles can be preferably used in view of handling property, etc.

As a commercially available product of the core-shell rubber particles, "Paraloid (registered trademark)" EXL-2655, EXL-2611, EXL-3387 (produced by Rohm and Haas) made of a butadiene/alkyl methacrylate/styrene copolymer, "Staphyloid (registered trademark)" AC-3355, TR-2122 (produced by Ganz Chemical Co., Ltd.) made of an acrylic acid ester/methacrylic acid ester copolymer, "Nanostrength (registered trademark)" M22, 51, 52, 53 (produced by Arkema), and "Kaneace (registered trademark)" MX series, (produced by Kaneka Corporation), for example, can be used.

If there are a plurality of types of particles like the components [D], [E] and [F] in the present invention, aggregation of different types of particles, so-called heteroaggregation, may occur in addition to self-aggregation. The heteroaggregation as referred to herein means that particles of two or more types differing in properties are aggregated together by Van der Waals force or electrostatic interaction.

Generally, that the component [F] undergoes self-aggregation to some extent to forma structure is believed to be advantageous for improving the conductivity because the component [F] forms a conductive path more readily. Surprisingly, however, when the component [F] is used in combination with the components [D] and [E] as in the present invention, a higher conductivity is developed in the event that the component [F] is dispersed in the component [B] without being heteroaggregated with the component [D]. This is believed because when the component [E] is present, the component [F] is more efficient for improving conductivity to be combined with the component [E] large in size and form a conductive path rather than to form a conductive path alone. For this reason, that the component [F] forms heteroaggregation with the component [E] is a preferable embodiment.

The presence of heteroaggregation of the component [D], the component [E], and the component [F] as raw materials can be checked by the following method, for example. The component [D], the component [E] and the component [F] are dispersed in the component [B], and then a hardener of the component [C] is incorporated. Then, the mixture is poured into a prescribed form and the temperature is raised from room temperature to a temperature of 180° C. at a rate of 1.5° C. per minute in a hot-air oven and then is held at a temperature of 180° C. for 2 hours. Thus, a 2 mm-thick cured resin plate is obtained. The resulting cured plate is sectioned with a microtome and then observed by a transmission electron microscope (TEM). When the component [D] and the component [F] heteroaggregate together, since the component [F] is very small as compared with the component [D], the component [F] is disposed so as to surround the component [D] and almost no component [F] is observed around the component [E] or in a resin region composed of the component [B] and the component [C].

When observation is performed using a prepreg, the check can be performed by the following method. Prepregs including the components [A], [B], [C], [D], [E], and [F] are laid-up in the number corresponding to a thickness of about 4 mm, affording a laminate. The resulting preliminary laminate is placed in an autoclave, and under a pressure of 0.6 MPa, it is heated from room temperature to a temperature of 180° C. at a rate of 1.7° C. per minute and cured at a temperature of 180° C. over 2 hours, affording a fiber reinforced composite material. The resulting fiber reinforced composite material is sectioned with a focused ion beam (FIB) apparatus, and observed by a transmission electron microscope (TEM). In the case where the viewable range is made small relative to the particle diameter of [D] or [E] by measuring at a magnification increased in order to observe the component [F] clearly, the amount of [F] existing near the surrounding region as large as $1/12$ to $1/2$ the circumference of the particles of [D] and [E] is measured, and then the amount of [F] existing in the entire region of each [D] particle and each [E] particle can be calculated.

As to the component [F] measured by the method in observation using the prepreg described above, the ratio Ne/Nd of the number of structure Ne of the component [F] present in a range of outside 110% of the particle diameter of the component [E] to the number of structure Nd of the component [F] present in a range of outside 110% of the particle diameter of the component [D] is 0.25 or more in embodiments of the present invention, preferably 0.6 or more, more preferably 1.0 or more. Due to the fact that the ratio Ne/Nd is sufficiently large, the component [F] assists the formation of a conductive path at between the component [E] and carbon fibers and the conductivity of a fiber reinforced composite material is dramatically increased. When the ratio Ne/Nd is less than 0.25, the component [F] becomes difficult to assist the formation of a conductive path between the component (E) and carbon fibers and the improvement in the conductivity of a fiber reinforced composite material becomes insufficient. In the present invention, "in a range of outside 110% of the particle diameter" indicates that the component [F] is distributed in an area protruding outside from the circumference of a particle by a length of 10% of the diameter of the particle where the diameter of the particle is taken as 100%. For example, for a particle having a particle diameter of 10 μm, it means within a range of up to 1 μm from the circumference of the particle.

As to the method for measuring the aforementioned Nd and Ne, a part of the component [F] is included in Nd and Ne if it exists in a range of outside 110% of the particle diameter of the component [D] or the component [E]. When the component [F] aggregates around the component [D] or the component [E] and the boundary between structures is not readily revealed, the aggregated matter is divided into circular shapes having a diameter equal to the structure size measured for the component [F] alone in the component [B] and then the measurement of Nd or Ne is carried out.

The structure size of the component [F] alone in the component [B] is measured by the following method as described below. An epoxy resin composition composed of the components [B], [C] and [F] is poured into a form and the temperature is raised from room temperature to a temperature of 180° C. at a rate of 1.5° C. per minute in a hot-air oven and then is held at a temperature of 180° C. for 2 hours. Thus, a 2 mm-thick cured resin plate is prepared. The cured plate obtained is sectioned with a microtome and observed by a transmission electron microscope (TEM), and for 60 arbitrary particles, the length of each particle at its longest position is measured as the particle diameter, and the average is defined as the structure size of the component [F] alone in the component [B].

It is preferred that at least one of the following formula (2) to formula (4) is satisfied where the zeta-potential of the component [D] is expressed by $\zeta d$ and the zeta-potential of the component [F] is expressed by $\zeta f$, because heteroaggregation of the component [D] and the component [F] is rendered unlikely to occur.

$$|\zeta d| < 10 \text{ mV} \quad \text{formula (2)}$$

$$|\zeta f| < 10 \text{ mV} \quad \text{formula (3)}$$

$$\zeta d \times \zeta f > 0 \text{ mV} \quad \text{formula (4)}$$

Although many of particles dispersed in a liquid are charged any of particles, an electrically neutral region far remote from the particles is defined as a zero point, and the potential of a sliding surface on which the movement of particles takes place relative to the zero point is defined as a zeta-potential. Generally, particles having zeta-potential of opposite sign readily undergo heteroaggregation, whereas particles having zeta-potential of identical sign unlikely undergo heteroaggregation due to electrostatic repulsions.

Examples of a method for measuring a zeta-potential include Electrokinetic Light Scattering, an Electrokinetic Sonic Amplitude method in which a sound field is measured by applying an alternating current electric field to a dispersion liquid, and a colloidal vibration current method. The zeta-potential of the present invention is measured by the Electrokinetic Light Scattering method after dispersing the components [D], [E], and [F] in ethanol.

In the Electrokinetic Light Scattering method, a zeta-potential can be determined by applying an electric field to particles (filler) to move (electrophorese) the particles, subjecting the moving particles to laser irradiation, and calculating an electrophoretic rate from changes of the frequencies of the irradiated light and the scattered light. Various devices known to the person skilled in the art are suitable for that purpose, such as, for example, those of the ZetaPlus or ZetaPALS series from Brookhaven Instruments Corporation. For measurement of very small potentials or for measurements in non-polar media or at high salt concentrations, the so-called phase analysis light scattering (PALS) technique can also be applied (e.g. using ZetaPALS devices).

In order to obtain a good dispersed state of the component [F] of the present invention, a dispersing agent, which is a component [H] of the present invention, may be used according to necessity. The component [H] may directly act on the component [F] to improve the dispersibility or alternatively may act on the component [D] or [E] to modify the surface condition or the electrostatic condition to indirectly contribute to the dispersibility of the component [F]. Since the dispersed state of the component [F] is improved by the inclusion of the component [H], the ratio Ne/Nd of the number of structure Ne of component [F] present in a range of outside 110% of the particle diameter of component [E] to the number of structure Nd of component [F] present in a range of outside 110% of the particle diameter of component [D] tends to be large.

A surfactant or a resin type dispersing agent can be used as the dispersing agent of the component [H], and use of a resin type dispersing agent is preferred.

Surfactants are mainly classified into anionic, cationic, nonionic and amphoteric, and an appropriate amount of an appropriate type of surfactant may be used according to the properties required.

There are no particular limitations on the anionic surfactant, and examples thereof include salts of fatty acids, polysulfonates, polycarboxylates, alkyl sulfate ester salts, alkyl aryl sulfonates, alkyl naphthalene sulfonates, dialkyl sulfonates, dialkyl sulfosuccinates, alkyl phosphates, polyoxyethylene alkyl ether sulfates, polyoxyethylene alkyl aryl ether sulfates, naphthalene sulfonic acid-formalin condensates, polyoxyethylene alkyl phosphate sulfonates, glycerol borate fatty acid esters, and polyoxyethylene glycerol fatty acid esters, and specific examples include sodium dodecylbenzene sulfonate, sodium laurate sulfate, sodium polyoxyethylene lauryl ether sulfate, polyoxyethylene nonylphenyl ether sulfate ester salts, and sodium salt of β-naphthalenesulfonic acid-formalin condensate.

Examples of the cationic surfactant include alkylamine salts and quaternary ammonium salts, and specific examples thereof include stearylamine acetate, coco alkyltrimethylammonium chloride, trimethyl(tallow alkyl)ammonium chloride, dimethyldioleylammonium chloride, methyl oleyl diethanol chloride, tetramethylammonium chloride, laurylpyridinium chloride, laurylpyridinium bromide, laurylpyridinium disulfate, cetylpyridinium bromide, 4-alkylmercaptopyridine, poly(vinylpyridine)-dodecyl bromide, and dodecylbenzyltriethylammonium chloride.

Examples of the nonionic surfactant include polyoxyethylene alkyl ethers, polyoxyalkylene derivatives, polyoxyethylene phenyl ethers, sorbitan fatty acid esters, polyoxyethylene sorbitan fatty acid esters, and alkyl allyl ethers, and specific examples thereof include polyoxyethylene lauryl ether, sorbitan fatty acid esters, and polyoxyethylene octyl phenyl ether.

Examples of the amphoteric surfactant include aminocarboxylates.

The surfactant is not necessarily limited to one type in choice, and two or more types of surfactant, such as a combination of an anionic surfactant and a nonionic surfactant, a combination of a cationic surfactant and a nonionic surfactant, can be used. As to the content in that case, the content described below is applied to each of the surfactant components. A preferable combination in use of two or more types of surfactant is a combination of an anionic surfactant and a nonionic surfactant. As the anionic surfactant to be used in this case, a polycarboxylic acid salt is preferred, and as the nonionic surfactant, a polyoxyethylene phenyl ether is preferred.

Specific examples of the resin type dispersing agent include polyurethane; polycarboxylates such as polyacrylates; unsaturated polyamides, polycarboxylic acids, (partial) amine salts of polycarboxylic acids, ammonium salts of polycarboxylic acids, alkylamine salts of polycarboxylic acids, polysiloxanes, long-chain polyaminoamide phosphates, hydroxyl group-containing polycarboxylates, and modified products of these compounds; oil-based dispersing agents such as amides formed via a reaction between a poly(lower alkyleneimine) and a polyester having free carboxyl groups, and salts thereof; (meth)acrylic acid-styrene copolymers, (meth)acrylic acid-(meth)acrylate ester copolymers, styrene-maleic acid copolymers, polyvinyl alcohol and polyvinylpyrrolidone; water-soluble resins and water-soluble polymer compounds such as polyvinyl alcohol and polyvinylpyrrolidone; polyester-based resins; modified polyacrylate-based resins; ethylene oxide/propylene oxide adducts; and phosphoric acid ester-based resins. These can be used singly or two or more of them can be used in combination, and this type of dispersing agent is not limited to these.

As to the content of the dispersing agent of the component [H], it is preferred to use this in an amount of about 0.5 to about 20% by weight relative to the component [E] or [F], or about 5 to about 50% by weight relative to the component [D].

Examples of commercially available dispersing agents include DISPER BYK-101, 103, 107, 108, 110, 111, 116, 130, 140, 154, 161, 162, 163, 164, 165, 166, 170, 171, 174, 180, 181, 182, 183, 184, 185, 190, 2000, 2001, 2020, 2025, 2050, 2070, 2095, 2150, 2155, or Anti-Terra-U, 203, 204, BYK-P104, P104S, 220S, 6919, or Lactimon, Lactimon-WS, or Bykumen, etc. produced by BYK Chemie GmbH; SOLSPERSE-3000, 9000, 13000, 13240, 13650, 13940, 16000, 17000, 18000, 20000, 21000, 24000, 26000, 27000, 28000, 31845, 32000, 32500, 32550, 33500, 32600, 34750, 35100, 36600, 38500, 41000, 41090, 53095, 55000, 76500, etc. produced by Lubrizol Japan Limited; EFKA-46, 47, 48, 452, 4008, 4009, 4010, 4015, 4020, 4047, 4050, 4055, 4060, 4080, 4400, 4401, 4402, 4403, 4406, 4408, 4300, 4310, 4320, 4330, 4340, 450, 451, 453, 4540, 4550, 4560, 4800, 5010, 5065, 5066, 5070, 7500, 7554, 1101, 120, 150, 1501, 1502, 1503, etc. produced by Ciba Japan K.K.; and Ajisper PA111, PB711, PB821, PB822, PB824, etc. produced by Ajinomoto Fine-Techno Co., Inc.

The prepreg of the present invention can be produced by various known methods using the components [A] to [F] described above. For example, a prepreg can be produced by such a method as a wet method in which a matrix resin is dissolved in an organic solvent selected from among acetone, methyl ethyl ketone, methanol, and the like to reduce its viscosity and used to impregnate reinforcing fibers or by a hot melt method in which a matrix resin is heated to reduce its viscosity without using any organic solvent and used to impregnate reinforcing fibers.

In the wet method, a prepreg can be produced by immersing reinforcing fibers in a liquid containing a matrix resin, then pulling them up, and then evaporating the organic solvent using an oven or the like.

In the hot melt method, there can be used a method in which reinforcing fiber is directly impregnated with a matrix resin whose viscosity has been reduced by heating, or a method in which a release paper sheet with a resin film (hereinafter occasionally expressed by "resin film") prepared by coating release paper or the like with a matrix resin is prepared first, and subsequently the resin film is put on reinforcing fiber from both sides or one side of the reinforcing fiber, and then the reinforcing fiber is impregnated with the matrix resin by heating and pressuring.

As a method for preparing the prepreg of the present invention, a hot melt method in which reinforcing fiber is impregnated with a matrix resin without using any organic solvent is preferable because the resulting prepreg is substantially free of a residual organic solvent.

As a method in which the prepreg of the present invention is prepared by a hot melt method, the following methods can specifically be enumerated, and it can be produced by any one of them.

Specifically, a first method is a so-called single stage impregnation hot melt method in which a resin film composed of [B] to [F] of the present invention is heated and pressured from one side or both sides of the component [A], thereby impregnating it with an epoxy resin composition in a single stage.

A second method is a multiple stage impregnation hot melt method in which an epoxy resin composition is heated and pressured from one side or both sides of the component [A], thereby impregnating it therewith in multiple stages. In the multiple stage impregnation hot melt method, there are no limitations on the number of stages of impregnating the component [A] with a matrix resin, but the required production cost increases with increase in the number of the stages. For this reason, there is preferably used a so-called two stage impregnation hot melt method in which an epoxy resin composition is heated and pressured from one side or both sides of the component [A], thereby impregnating it therewith in two stages. Among the two stage impregnation hot melt methods, there is preferably used a method in which the component [A] is first impregnated from one side or both sides thereof with a resin film 1 composed of the components [B], [C] and [f] and being substantially free of the components [D] and [E], thereby obtaining a prepreg precursor, and then a resin film 2 composed of the components [B] to [F] and containing the components [D] and [E] is stuck on both sides or one side of the prepreg precursor, thereby obtaining a prepreg.

In the case of having used the single stage impregnation hot melt method, the components [D] and [E] are disposed selectively at the surface of the prepreg by the component [A] blocking the intrusion of particles of the components [D] and [E] during the step of impregnating the component [A] with a resin film composed of the components [B] to [F] of the present invention. However, it is difficult to completely block the particles of the components [D] and [E] by the component [A], and part of the component [D] can enter into the layer formed of the component [A].

On the other hand, in the case of having used the two stage impregnation hot melt method, particles of the components [D] and [E] can be disposed selectively at the surface of the prepreg by first impregnating the component [A] with a resin film 1 being free of the components [D] and [E], and then, to the resulting prepreg precursor is stuck a resin film 2 containing the components [D] and [E]. Accordingly, the prepreg prepared by the two stage impregnation hot melt method is rich in the components [D] and [E] in the ranges corresponding to up to 15% of the average thickness of the prepreg measured by the method described later.

The prepreg of the present invention can afford a fiber reinforced composite material having both high impact resistance and high thickness-direction conductivity due to the fact that particles of the components [D] and [E] are disposed selectively in the ranges corresponding to up to 15% of the average thickness of the prepreg from each surface of the prepreg. The two stage impregnation hot melt method is preferable because a larger amount of particles of the components [D] and [E] can be disposed at a prepreg surface.

A matrix resin composed of the components [B] to [F] to be used in the present invention (hereinafter referred to epoxy resin composition) can be prepared by various known methods. One example is a method of kneading the individual components with a kneader. Alternatively, the individual components may be kneaded with a twin screw extruder.

Preparation of the prepreg according to an aspect of the present invention by the two stage impregnation hot melt method described above requires a primary resin for obtaining a prepreg precursor by impregnating the component [A] therewith in the first stage, and a secondary resin to be stuck to both sides or one side of the prepreg precursor in the second stage. The primary resin is composed of the components [B], [C] and [F] and is substantially free of the components [D] and [E]. The secondary resin is composed of the components [B] to [F] and substantially contains the components [D] and [E].

In the case of producing such a primary resin with a kneader, for example, in the case of blending the component [B], an epoxy resin, a thermoplastic resin, and others first, they are heated and mixed at a temperature within the range of 100 to 200° C. Subsequently, those are cooled to a temperature of 70° C. or lower, and then the component [F] is dispersed. In many cases, the component [F] has formed a aggregated form, and therefore, if all components are kneaded together at a time, adequate dispersion may not be achieved. As to the size of the structure formed by the component [F], if it is excessively large as described above, the structure cannot enter into between bundles formed of the component [A] or into gaps between bundles formed of the component [A] and conductive particles of the component [E] which are in defective contact. Therefore, it is favorably within the range of 100 to 800 nm, preferably within the range of 120 to 600 nm, and more preferably within the range of 130 to 400 nm. As a method for adjusting the component [F] to have such a particle size range, a masterbatch is produced beforehand using part of the component [B] and the component [F] and then is used. The masterbatch can be produced by a variety of known methods. Such methods include, for example, stirring with a ball mill, stirring with a homomixer or a homogenizer, and ultrasonic stirring. After dispersing the component [F], an aromatic amine compound of the component [C] is added and kneaded at the last.

In the prepreg of the present invention, the ranges corresponding to up to 13% of the average thickness of the resulting prepreg from each surface of the prepreg is preferably composed of the components [B] to [F]. In other words, the ranges corresponding to up to 13% of the average thickness of the prepreg from each surface of the prepreg is preferably free of the component [A]. Employment of a prepreg with such a structure makes it possible to form an interlayer resin layer within a resulting fiber reinforced composite material. Here, the thickness of the matrix resin layer located at the prepreg surface can be assessed by the following method. Specifically, the prepreg produced according to the present invention is sandwiched between two smooth support plates and, while maintaining close contact, it is cured by gradually raising its temperature over a long time. In this step, it is important to perform gelation at a temperature being as low as possible. If the temperature is raised before start of gelation, the resin in the prepreg will flow to prevent accurate assessment of the thickness of the matrix resin layer, and therefore, the prepreg is cured to form a fiber reinforced composite material by additionally raising the temperature gradually over time after start of gelation. A cross section of the resulting fiber reinforced composite material is polished and photographed by an epi-illumination type optical microscope at a magnification of ×200 or more. First, this photograph of a cross section is used to determine the average thickness of the prepreg. As to the average thickness of the prepreg, thickness is measured at at least five positions arbitrarily selected on a photograph, and the average of the measurements is calculated. Then, the thickness of the matrix resin layer formed at the surface of the fiber reinforced composite material is determined. The thickness of the matrix resin layer is also measured at at least five positions arbitrarily selected on a photograph, and the average of the measurements is calculated. From the average thickness of the prepreg and the average thickness of the matrix resin layer thus obtained, their ratio can be calculated.

It is also preferable that in the prepreg of the present invention, 85% by mass or more of each of the components [D] and [E] be present in the ranges corresponding to up to 15% of the average thickness of the resulting prepreg from each surface of the prepreg. In other words, the components [D] and [E] are preferably localized at the surfaces of the prepreg. Forming a prepreg with such a structure makes it possible to form a interlayer resin layer in which the components [D] and [E] are disposed selectively in a resulting fiber reinforced composite material and allows a fiber reinforced composite material having high impact resistance and high thickness-direction conductivity to be obtained.

Here, the degree of the localization of the particles in the prepreg can be evaluated as described below. Specifically, after obtaining a fiber reinforced composite material in accordance with the method described above, a cross section thereof is polished and photographed by an epi-illumination type optical microscope at a magnification of ×200 or more. First, this cross-sectional photograph is used to determine the average thickness of the prepreg. As to the average thickness of the prepreg, thickness is measured at at least five positions arbitrarily selected on a photograph, and the average of the measurements is calculated. Then, lines parallel to the outermost surfaces of the prepreg are drawn at positions corresponding to 15% of the thickness of the prepreg from the surface in contact with each support plate. For each surface of the prepreg, the total cross-sectional area of individual particles existing between the surface in contact with each support plate and the 15% parallel line is determined. In addition, the total cross-sectional areas of the particles of the component [E] and the particles of the component [F] existing over the entire thickness of the prepreg, respectively, are also determined. The ratio of the total cross-sectional area of the individual particles existing in the ranges corresponding to up to 15% of the average thickness of the prepreg from each surface of the prepreg to the total cross-sectional area of the particles existing over the entire thickness of the prepreg is defined as the amount of particles existing within 15% of the average thickness of the prepreg from each surface of the prepreg. The determination of the cross-sectional area of the particles may be carried out by using an image analyzer or by cutting out all the particle portions contained in the prescribed regions in the cross-sectional photograph and measuring their weight. To eliminate the influence of the partial variation in particle distribution, this evaluation should cover the entire width of the photograph and the same evaluation procedure should be performed for photographs taken at arbitrarily-selected five or more positions, followed by calculation of the average. If it is difficult to distinguish between particles and the matrix resin, either of them may be dyed selectively in observation. The microscope to be used may be either an optical microscope or a scanning electron microscope, and a suitable one may be used depending on the particle size and the dyeing method used. In the present invention, the area ratio calculated as described above is defined as the mass ratio of the particles existing in the ranges corresponding to up to 15% of the average thickness of the prepreg from each surface of the prepreg.

It is also possible to determine the number-average particle sizes of the components [D] and [E] by magnifying and photographing a cross section of a resulting fiber reinforced composite material at a magnification of ×200 or more by an epi-illumination type optical microscope, and then measuring a diameter for particles of the components [D] and [E]. Specifically, a particle diameter of 100 arbitrary particles is measured for particles of the component [D] and for particles of the component [D], and the averages are defined as number-average particle sizes.

Preferable ranges of the number-average particle sizes of the components [D] and [E] are the same as the preferable range of the number-average particle size previously described.

Moreover, in the prepreg of the present invention, the volume content of carbon fibers of the component [A] (hereinafter referred to as Vf) is preferably within a range of 50 to 67% by volume, more preferably within a range of 53 to 65% by volume, even more preferably within a range of 56 to 62% by volume. Bringing Vf into such a range not only allows a resulting fiber reinforced composite material to have high conductivity, but also makes it possible to prevent the resulting fiber reinforced composite material from increasing in weight and also to inhibit generation of defects such as unimpregnated parts or voids inside the fiber reinforced composite material, thereby obtaining a fiber reinforced composite material excellent in mechanical properties.

Here, the Vf of a prepreg is a value determined by the following method. Specifically, a specimen having a size of 100×100 mm is cut out of a prepreg obtained in the present invention, and the thickness thereof is measured with a micrometer and then the volume is calculated. Subsequently, a carbon fiber mass per unit area is measured in accordance with the testing method of "Prepreg mass per unit area, and carbon fiber mass, resin mass content, and fiber mass content per unit area" disclosed in JIS K7071 (1988), and then a volume is calculated using a density presented by a carbon fiber manufacturer and the volume is divided by the volume of the specimen. The thus calculated value is used.

The fiber reinforced composite material of the present invention can be produced by curing the prepreg of the present invention. A variety of known methods are available for molding a fiber reinforced composite material using a prepreg. There can preferably be used, for example, a method in which a resulting prepreg is cut into a prescribed size and then the cut is, individually or after laying-up a prescribed number of prepregs, heat-cured under a pressure.

Techniques available for heat-curing a prepreg laminate under a pressure include press molding, an autoclave molding method, a bagging molding method, a wrapping tape method, and an internal pressure molding method, and an appropriate method is used according to the intended use. Especially, in the case of aircraft and spacecraft applications, it is preferable to use the autoclave molding method because fiber reinforced composite materials with excellent performance and stable quality can be obtained.

The temperature at which a fiber reinforced composite material is molded needs to be adjusted appropriately depending upon the type of the hardener of the component [C] contained in the thermosetting resin of the component [B]. For example, when using an aromatic amine compound as the component [C], molding is usually performed at a temperature within a range of 150 to 220° C. If the molding temperature is excessively low, sufficiently high curability may not be achieved whereas if it is excessively high, warp due to heat strain may readily be caused.

The pressure applied when molding a fiber reinforced composite material by an autoclave molding method varies depending upon the thickness of a prepreg, the volume content of carbon fiber, etc, it is usually within a range of 0.1 to 1 MPa. Bringing the molding pressure into this range makes it possible to obtain a fiber reinforced composite material that has therein no defects such as voids and that is free of warp or other size variations.

The fiber reinforced composite material of embodiments of the present invention is characterized in including particles containing a thermoplastic resin as a primary component, namely component [D], conductive particles, namely component [E], and a filler comprising a carbon material, namely component [F], as described above, and having high impact resistance and high thickness-direction conductivity.

In the present invention, impact resistance can be measured in terms of compression after impact (hereinafter referred to as CAI). The CAI is measured as CAI of a specimen after giving an impact energy of 6.7 J per mm in thickness in accordance with JIS K7089 (1996). The CAI of the fiber reinforced composite material of the present invention is preferably 230 MPa or more, more preferably 280 MPa or more. The CAI within such a range is preferable because this expands the range of applicable structural members of aircrafts, etc. The upper limit of CAI is not particularly limited, and the higher the value thereof, the higher the safety in the case of applying the fiber reinforced composite material as a structural member.

In the present invention, the thickness-direction conductivity can be measured by the following method. Specifically, items prepared by repeating twice a unidirectional prepreg obtained in the present invention on the basis of [+45°/0°/−45°/90° ] where the longitudinal direction of the carbon fibers is defined as 0° are laid-up symmetrically, followed by heating and pressuring by an autoclave. From the thus obtained panel of a fiber reinforced composite material is cut out a piece in a size of 50 mm in length and 50 mm in width, from which the resin layers of both surfaces are removed completely by polishing, and then a conductive paste is applied to both surfaces. Thus, a sample piece is prepared. The volume resistivity determined by measuring the lamination-direction resistance of the obtained sample piece by the four-terminal method using an R6581 digital multimeter manufactured by Advantest Corporation is defined as the thickness-direction conductivity.

As the conductive paste, "DOTITE (registered trademark)" D-550, FN-101, D-500, D-362, XA-9015, FE-107, XC-12, XC-32, SH-3A, XA-436, FA-545, XA-824, FC-403R, XC-223, FA-501, FA-333, FA-353N, XA-602N, XA-472, FC-415, XB-101G, SN-8800G, XB-114, XB-107, XB-110, FH-889, FEL-190, FEL-615, FEC-198, FEA-685, XB-101G (produced by Fujikura Kasei Co., Ltd.); N-2057, N-2057A (produced by Shoei Chemical, Inc.); CA-6178 and CA-6178B, CA-6178T, CA-2500E, CA-BE04 (produced by Daiken Chemical Co., Ltd.); SP, SD, ST, SF, SL, SI, NPS-J, NPS, NPS-J-HTB, NPS-HTB, NPG-J (produced by Harima Chemicals, Inc.) "MDot (registered trademark)"-SLP, "CUX (registered trademark)"-R Series (produced by Mitsuboshi Belting Ltd.), etc. can be used.

The thickness-direction volume resistivity of the fiber reinforced composite material of the present invention, which is a measure of thickness-direction conductivity, is preferably 6 Ωcm or less, more preferably 4 Ωcm or less, and even more preferably 3 Ωcm or less. Adjusting the thickness-direction volume resistivity to such a range makes it possible to inhibit electric damages such as a thunderbolt and electrostatic dissipation when using the fiber reinforced composite material as a member, and especially in aircraft applications, it is effective also on weight reduction because it can reduce metal mesh or the like provided on a member surface as a countermeasure against a thunderbolt. Here, the thickness direction of a fiber reinforced composite material means the direction along which the prepregs of the present invention to be used for the production of the material are laid-up.

The fiber reinforced composite material obtainable from the prepreg of the present invention is excellent in strength, stiffness, impact resistance, thickness-direction conductivity, etc., and for this reason, it can be used suitably for a wide variety of applications, such as aerospace applications including primary structural members, such as the fuselage, main wings, tail wings, and floor beams of an aircraft, secondary structural materials, such as flaps, ailerons, cowls, fairings, and interior materials, rocket motor casings, and an artificial satellite structural members, structural materials of moving bodies such as motor vehicles, ships and rolling stocks, building materials, blades of wind mills, and computer applications such as IC trays and housings of laptop computers.

EXAMPLES

Hereinafter prepreg and carbon fiber composite materials according to the present invention are described in more detail below with reference to Examples. Meanwhile, the "parts" used as units of chemical composition rates mean parts by mass unless otherwise stated. Determination of characteristics (physical properties) was performed in an environment with a temperature of 23° C. and a relative humidity of 50% unless otherwise specified.
<Materials Used in Examples>

(1) Component [A]: Carbon Fibers
   "TORAYCA (registered trademark)" T800S-24K-10E (number of fibers: 24,000, tensile modulus: 294 GPa, density: 1.8 g/cm$^3$, produced by Toray Industries, Inc.)

(2) Component [B]: Thermosetting Resin (Polyfunctional Epoxy Resin)
   "Araldite (registered trademark)" MY721 (component: tetraglycidyldiaminodiphenylmethane produced by Huntsman Advanced Materials)
   "jER" 630 (component: triglycidyl-p-aminophenol, produced by Mitsubishi Chemical Corporation)

(3) Component [B]: Thermosetting Resin (Epoxy Resin Having Di-Functionality)
   "Araldite (registered trademark)" GY282 (component: bisphenol F type epoxy resin, produced by Huntsman Advanced Materials)
   GAN (component: N,N-diglycidylaniline, produced by Nippon Kayaku Co., Ltd.)

(4) Component [C]: Hardener
   "SEIKACURE (registered trademark)" S (4,4'-diaminodiphenylmethane, produced by Seika Corporation)

(5) Component [D]: Particles Containing Thermoplastic Resin as Primary Component
   Nylon 12 particles SP-10 (component: nylon 12, number-average particle size: 10 μm, shape: spherical, produced by Toray Industries, Inc.)
   "Orgasol" 1002DNAT1 (component: nylon 6, number-average particle size: 20 μm, produced by Arkema)
   Particles A (particles having a number-average particle size of 13 μm, prepared using "TROGAMID (registered trademark)" CX7323 as a raw material)
   (method for producing particles A: performed with reference to WO 2009/142231)

To a 1,000 ml pressure resistant glass autoclave (Hyper Glaster TEM-V1000N produced by Taiatsu Techno Corporation) were added 35 g of polyamide (weight average molecular weight: 17,000, "TROGAMID (registered trademark)" CX7323 produced by Degussa Co., Ltd.) as polymer A, 287 g of N-methyl-2-pyrrolidone as an organic solvent, and 28 g of polyvinyl alcohol ("Gohsenol (registered trademark)" GM-14 produced by The Nippon Synthetic Chemical Industry Co., Ltd., weight-average molecular weight: 29,000, sodium acetate content: 0.23% by mass, SP value: 32.8 J/cm$^3$)$^{1/2}$)) as polymer B, which were heated up to 180° C. after performing replacement of the atmosphere in the autoclave with nitrogen by 99% or more, and were stirred for 2 hours until the polymers dissolved. Thereafter, 350 g of ion exchange water was dropped as a poor solvent at a speed of 2.92 g/min via a feeding pump. At the time when approximately 200 g of the ion exchange water was added, the system turned white. After the whole amount of water was completely poured, the temperature was lowered under stirring, and the resulting suspension was filtered, re-slurry washed by the addition of 700 g of ion exchange water, and then substances collected by filtration were vacuum dried at 80° C. for 10 hours. Thus, 34 g of a gray colored solid material was obtained. The powder obtained was observed by a scanning electron microscope to be composed of polyamide particles having an average particle size of 13 μm.

Particles B produced by the following production method (number-average particle size: 13 μm)

To a mixed solvent of 300 parts of chloroform and 100 parts of methanol were added 90 parts of a transparent polyamide ("Grilamid (registered trademark)" TR55, produced by EMS-CHEMIE (Japan) Ltd.), 7.5 parts of an epoxy resin ("jER (registered trademark)" 828, produced by Mitsubishi Chemical Corporation) and 2.5 parts of a hardener ("Tohmide (registered trademark)" #296, produced by T&K TOKA Corporation), and thus a homogeneous solution was obtained. Then, using a spray gun for painting, the resulting homogeneous solution was sprayed against the liquid surface of 3,000 parts of n-hexane under stirring, and thereby the solute was precipitated. The precipitated solid was collected by filtration and washed with n-hexane well, and then vacuum dried at a temperature of 100° C. for 24 hours. Thus, epoxy-modified nylon particles B having a spherical semi IPN structure were obtained. The resulting epoxy-modified nylon particles A were press molded to form a resin plate, and then the $G_{Ic}$ value thereof according to a compact tension method was measured in accordance with ASTM D 5045-96 to be 4420 J/m$^2$.

(6) Component [E]: Conductive Particles
   Conductive particles A (component: carbon, number-average particle size: 28 μm) prepared by calcining phenol resin particles (MARILIN HF type, produced by GUN EI Chemical Industry Co., Ltd.) at 2,000° C., followed by classification "Glassy Carbon (registered trademark)" (component: carbon, number-average particle size: 26 μm, produced by Tokai Carbon Co., Ltd.)

"MICRO PEARL (registered trademark)" AU225 (component: particles prepared by plating polydivinylbenzene polymer particles with nickel and further plating with gold, number-average particle size: 25.0 μm, produced by Sekisui Chemical Co., Ltd.)

Conductive particles B (component: carbon; number-average particle diameter: 36 μm) prepared by calcining phenol resin particles (MARILIN HF type, produced by GUN EI Chemical Industry Co., Ltd.) at 2000° C., followed by classification Conductive particles C (component: carbon; number-average particle diameter: 33 μm) prepared by calcining phenol resin particles (MARILIN HF type, produced by GUN EI Chemical Industry Co., Ltd.) at 2000° C., followed by classification Conductive particles D (component: carbon; number-average particle diameter: 20 μm) prepared by calcining phenol resin particles (MARILIN HF type, produced by GUN EI Chemical Industry Co., Ltd.) at 2000° C., followed by classification Conductive particles E (component: carbon; number-average particle diameter: 16 μm) prepared by calcining phenol resin particles (MARILIN HF type, produced by GUN EI Chemical Industry Co., Ltd.) at 2000° C., followed by classification The number-average particle sizes of the individual materials are values measured in accordance with "(I) Measurement of particle diameter of each of components [D] and [E]" contained in the evaluation methods described below. The number-average particle size in a prepreg can be measured according to "(IV) Measurement of Particle Size of Each of Components [D] and [E] in Prepreg" contained in the evaluation methods described below.

(7) Component [F]: Carbon Black

"Printex (registered trademark)" L6 (component: furnace black, number-average particle size of primary particles=23 nm, produced by Orion Engineered Carbons)

"Printex (registered trademark)" L (component: furnace black, number-average particle size of primary particles=23 nm, produced by Orion Engineered Carbons)

"Printex (registered trademark)" P (component: furnace black, number-average particle size of primary particles=23 nm, produced by Orion Engineered Carbons)

Special Black 550 (component: furnace black, number-average particle size of primary particles=23 nm, produced by Orion Engineered Carbons)

ECP600JD (component: furnace black, number-average particle size of primary particles=25 nm, produced by LION Corporation)

"Mitsubishi (registered trademark)" Conductive Carbon Black #3230B (component: furnace black, number-average particle size of primary particles=23 nm, produced by Mitsubishi Chemical Corporation).

(8) Component [G]: Thermoplastic Resin Composed of a Polyaryl Ether Skeleton

"Virantage (trademark registration)" VW-10700RFP (component; terminal hydroxyl group polyethersulfone, produced by Solvay Specialty Polymers).

(9) Component [H]: Dispersing Agent

DISPERBYK-111 (produced by BYK Chemie GmbH)

DISPERBYK-2155 (produced by BYK Chemie GmbH)

<Evaluation Methods>

(I) Measurement of Particle Diameter of Each of Components [D] and [E]

For each of the components [D] and [E], observation was performed with a magnification of ×200 or more by a laser microscope (color 3D profile microscope VK-9510; manufactured by KEYENCE CORP.), and for 60 arbitrary particles, the diameter of a circumscribed circle of each particle was measured as its particle size, and the averages thereof were defined as the number-average particle sizes of the components [D] and [E], respectively. Particles of smaller than 1 μm in particle diameter are not used for the calculation of a number-average particle size.

(II) Measurement of Carbon Black Structure Size of Component [F] in Component [B]

An epoxy resin composition (primary resin) composed of components [B], [C], and [F] or, in the cases of compositions containing [G], an epoxy resin composition (primary resin) composed of components [B], [C], [F], and [G] obtained in Examples and Comparative Examples was poured into a form, and the temperature thereof was raised at a rate of 1.5° C. per minute from room temperature to a temperature of 180° C. in a hot-air oven and then held at a temperature of 180° C. for 2 hours. Thus, a 2 mm-thick resin cured plate was prepared. The cured plate obtained was sectioned with a microtome and observed by a transmission electron microscope (TEM), and for 60 arbitrary particles, the length of each particle at its longest position was measured as the particle diameter, and the average was defined as the carbon black structure size of the component [F] in the component [B]. Particles 5 μm or more in particle diameter are not used for the calculation of carbon black structure size.

(III) Method for Measuring Zeta-Potential

The zeta-potential of each of the components [D] and [F] was measured at a voltage of 60 V, at room temperature (23° C.±2° C.) using ethanol as a dispersion medium by using an electrophoretic light scattering photometer ELS-Z2 manufactured by Otsuka Electronics Co., Ltd. Each sample was prepared so as to have a concentration of 0.1 wt % relative to the dispersion medium and then used as a measurement solution. The measurement was carried out 5 times and the average value thereof was defined as zeta-potential $\zeta$ (mV).

(IV) Measurement of Particle Size of Each of Components [D] and [E] in Prepreg

For the prepreg obtained in each of Examples and Comparative Examples, a cross section of a prepreg cured by the procedure of (VII) described below was magnified by an epi-illumination type optical microscope at a magnification of ×200 or more and then photographed at five points. Subsequently, from the resulting cross-sectional photograph, the particle diameter of 60 particles of the component [D] and that of 60 particles of the component [E] were measured, and the average values were taken as the number-average particle sizes of the components [D] and [E], respectively. Particles of smaller than 1 μm in particle diameter are not used for the calculation of a number-average particle size.

(V) Measurement of Average Particle Size of Primary Particles of Component [F] in Prepreg The prepreg prepared by curing the prepreg obtained in each of Examples and Comparative Examples by the procedure of (VII) described below as sectioned with a focused ion beam (FIB) apparatus, and was observed by a transmission electron microscope (TEM) and the particle diameter of 60 arbitrary particles was measured, and then the average value was taken as a number-average particle size.

(VI) Method for Measuring the Ratio Ne/Nd of the Number of Structure Ne of Component [F] Present in a Range of Outside 110% of the Particle Diameter of Component [E] to the Number of Structure Nd of Component [F] Present in a Range of Outside 110% of the Particle Diameter of Component [D]

The longitudinal direction of the carbon fibers contained in the prepreg obtained in each of Examples and Comparative Examples is defined as 0°, and items prepared by repeating a base of [+45°/0°/−45°/90° ] three times are laid-up symmetrically, thereby forming a quasi-isotropic preliminary laminate with 24 plies in total. The resulting preliminary laminate was placed in an autoclave, and under a pressure of 0.6 MPa, it was heated from room temperature to a temperature of 180° C. at a rate of 1.7° C. per minute and cured at a temperature of 180° C. over 2 hours, affording a fiber reinforced composite material. The resulting fiber reinforced composite material was sectioned with a focused ion beam (FIB) apparatus, and using a transmission electron microscope (TEM), the amount of the component [F] present in a range of outside 110% of the particle diameter and Ne/Nd were measured for 20 particles of each of the components [D] and [E].

(VII) Evaluation for Components in the Ranges Corresponding to Up to 13% of the Average Prepreg Thickness from Each Prepreg Surface The prepreg obtained in each of Examples and Comparative Examples was sandwiched between two polytetrafluoroethylene plates with smooth surfaces and brought into close contact, and then the temperature was increased gradually up to 150° C. over 7 days to ensure gelation and curing, thus producing a plate-shaped cured material. After the completion of the curing, the cured material was cut in a direction perpendicular to the contact interfaces (thickness direction), and a cross section was polished and photographed by an epi-illumination type optical microscope at a magnification of ×200 or more in such a manner that the upper and lower surfaces of the prepreg were included in the field of view. The distance between the polytetrafluoroethylene resin plates was measured at five positions aligned in the lateral direction in the cross-sectional photograph, and the average of the measurements was defined as the average thickness of the prepreg.

This photograph was used for checking the presence of carbon fiber of the component [A] in the ranges corresponding to up to 13% of the average thickness of the prepreg from each surface of the prepreg.

(VIII) Evaluation of the Abundance Ratio of Each Type of Particles of the Components [D] and [E] Present within a Range of Up to 15% of the Average Thickness of the Prepreg For the prepreg obtained in each of Examples and a Comparative Examples, the average thickness of the prepreg was measured by the procedure of (VII) described above. On the photograph of this cured prepreg, two lines parallel to the surfaces of the prepreg were drawn at positions corresponding to a depth of 15% of the average thickness of the prepreg, and the total area of the particles of the components [D] and [E] present between the surfaces of the prepreg and the parallel lines and the total area of all the particles present throughout the thickness of the prepreg were measured, and then the abundance ratio of the particles present within the ranges of up to a depth of 15% from the surfaces of the prepreg relative to 100% of the thickness of the prepreg was calculated. Here, the total area of the particles of each component was determined by cutting the particle portions out of the cross-sectional photograph and converting their mass.

(IX) Measurement of Volume Content (Vf) of Carbon Fibers in Prepreg

First, a carbon fiber mass per unit area is measured in accordance with the testing method of "Prepreg mass per unit area, and carbon fiber mass, resin mass content, and fiber mass content per unit area" disclosed in JIS K7071 (1988). Specifically, a specimen sized 100×100 mm is cut out of the prepreg obtained in each of Examples and Comparative Examples, and the thickness thereof is measured at five points and the average of the measurements is taken as an average thickness. Then, the volume is calculated. Subsequently, at a temperature of 23° C., the specimen is put into a beaker and about 200 ml of methyl ethyl ketone (MEK) is poured, followed by 15-minutes agitation by ultrasonification. After filtering the supernatant liquid with a previously weighed glass filter, MEK is poured into the beaker in which carbon fibers of the component [A] remain, and the operation described above is repeated three times. After the completion of the third operation, the carbon fibers are also moved onto the glass filter and filtered by suction. After the filtration, the carbon fibers are dried together with the glass filter in a drier at a temperature of 105° C. for 90 minutes and then cooled in a desiccator for 45 minutes or more, followed by measuring the mass of the glass filter containing the carbon fibers, and this measurement minus the previously measured mass of the glass filter is taken as the mass of the carbon fibers. Using the density of the carbon fibers presented by the carbon fiber manufacturer, the volume is calculated from the carbon fiber mass determined by the measurement. Vf was calculated by dividing the resulting volume of the carbon fibers by the volume of the specimen calculated first. The measurement was performed three times and the average value was taken as Vf (% by volume) of the prepreg.

(X) Method for Measuring Conductivity of Fiber Reinforced Composite Material

The longitudinal direction of the carbon fibers contained in the prepreg obtained in each of Examples and Comparative Examples is defined as 0°, and items prepared by repeating a base of [+45°/0°/−45°/90° ] twice are laid-up symmetrically, thereby forming a quasi-isotropic preliminary laminate with 16 plies in total. The resulting preliminary laminate was placed in an autoclave, and under a pressure of 0.6 MPa, it was heated from room temperature to a temperature of 180° C. at a rate of 1.7° C. per minute and cured over 2 hours at a temperature of 180° C., affording a fiber reinforced composite material. From the resulting fiber reinforced material was cut out a sample of 40 mm in length and 40 mm in width, and the resin layers of both surfaces were removed by polishing. Then, a conductive paste N-2057 (produced by Shoei Chemical Inc.) was applied to both sides in a thickness of about 70 μM by using a bar coater and then cured in a hot-air oven controlled at a temperature of 180° C. over 30 minutes. Thus, a sample for conductivity evaluation was obtained. The thickness-direction resistance of the sample obtained was measured by a four-terminal method using an R6581 digital multimeter (produced by Advantest Corporation). The measurement was performed six times and the average value was taken as the volume resistivity (Ωcm) of the fiber composite material.

(XI) Method for Measuring Compression after Impact (CAI) of Fiber Reinforced Composite Material The longitudinal direction of the carbon fibers contained in the prepreg obtained in each of Examples and Comparative Examples is defined as 0°, and items prepared by repeating a base of [+45°/0°/−45°/90° ] three times are laid-up symmetrically, thereby forming a quasi-isotropic preliminary laminate with 24 plies in total. The resulting preliminary laminate was placed in an autoclave, and under a pressure of 0.6 MPa, it was heated from room temperature to a temperature of 180° C. at a rate of 1.7° C. per minute and cured over 2 hours at a temperature of 180° C., affording a fiber reinforced composite material. From the resulting fiber reinforced composite material, rectangular specimens of 150 mm length and 100 mm width were cut out. At the center of each specimen, a falling weight impact of 6.7 J per 1 mm thickness of the specimen was applied in accordance with JIS K7089 (1996), and the residual compression was measured in accordance with JIS K7089 (1996). The measurement was performed six times and the average value was defined as compression after impact (CAI) (MPa).

Example 1

A prepreg was prepared by the following procedure.
(Preparation of Carbon Black Masterbatch)
Twenty parts of "Printex (registered trademark)" L, which was carbon black corresponding to the component [F], was added to 80 parts of "Araldite (registered trademark)" MY721, which was an epoxy resin corresponding to the component [B], and was stirred slowly with a spatula or the like, and then carbon black was dispersed with a three-roll mill, affording a carbon black masterbatch. These operations were performed under a room temperature environment.
(Preparation of Primary Resin)
The component [B] given in Table 1 (excluding the portion contained in the above-described carbon black masterbatch) and the component [G] were charged into a kneading apparatus and heat-kneaded, and thus the component [G] was dissolved. Eight parts of the carbon black masterbatch prepared beforehand (containing 1.6 parts of carbon black component) was added and stirred.

Subsequently, the component [C] given in Table 1 was added and stirred, affording a primary resin of an epoxy resin composition.

For the resulting resin composition, the size of the carbon black structure, which was the component [F] in the component [B], was measured in accordance with "(III) Measurement of the size of carbon black structure which is component [F] in component [B]" contained in the evaluation methods described above and, as the result, it was found to be 180 nm.
(Preparation of Secondary Resin)
The component [B] given in Table 1 (excluding the portion contained in the above-described carbon black masterbatch) and the component [G] were charged into a kneading apparatus and heat-kneaded, and thus the component [G] was dissolved. Eight parts of the carbon black masterbatch prepared beforehand (containing 1.6 parts of carbon black component) was added and stirred and thereby uniformly dispersed. Subsequently, the component [E] given in Table 1 was added and stirred until becoming uniform, and then the component [D] given in Table 1 is added and stirred. The component [C] given in Table 1 was added and stirred for 30 minutes, affording a secondary resin of an epoxy resin composition.
(Preparation of Prepreg)
Two resin films 1 having a resin areal weight of 24 g/m² were prepared by applying the primary resin obtained above to release paper with a knife coater. Likewise, two resin films 2 having a resin areal weight of 23.5 g/m² were prepared by applying the secondary resin obtained above to release paper.

Subsequently, carbon fibers of the component [A] arranged in parallel along one direction so as to form a sheet with a carbon fiber areal weight of 192 g/m² were sandwiched by two resin films 1 on both sides of the carbon fibers and then were impregnated with the epoxy resin composition by heating and pressuring, and thus a prepreg precursor was obtained.

The resulting prepreg precursor was sandwiched by the resin films 2 on both sides of the prepreg precursor, followed by heating and pressuring, and thus, a prepreg was obtained.

The resulting prepreg was measured to determine its Vf in accordance with "(IX) Measurement of the volume content (Vf) of carbon fibers in prepreg" contained in the evaluation methods described above and, as the result, the Vf was found to be 57 volume % and the prepreg was suitable as a structural member.

The compositions of the components [B] through [G] occupying in the resulting prepreg are as follows.
Component [B];
"Araldite (registered trademark)" MY721: 60 parts,
"Araldite (registered trademark)" GY282: 40 parts.
Component [C];
"SEIKACURE (registered trademark)" S: 42 parts.
Component [D];
Particles A: 21.3 parts.
Component [E];
Conductive particles A: 4.3 parts.
Component [F];
"Printex (registered trademark)" L: 2.4 parts.
Component [G];
"Virantage (trademark registration)" VW-10700RFP: 16 parts.

For each of the component [D] and the component [F], measurement of zeta-potential was carried out in accordance with "(III) Method for measuring zeta-potential" and, as the result, the component [D]: 5 mV, and the component [F]: −43 mV.
(Evaluation of Prepreg Characteristics)
For the resulting prepreg, the evaluation of the component located within a range corresponding to 13% of the average thickness of the prepreg from the surface of the prepreg was performed in accordance with "(VII) Evaluation of the component located within a range corresponding to 13% of the average thickness of the prepreg from the surface of the prepreg" and, as the result, no component [A] was contained. In addition, the abundance ratio of each type of particles of the components [D] and [E] present within a range of up to 15% of the average thickness of the prepreg from the surface of the prepreg were evaluated in accordance with "(VIII) Evaluation of the abundance ratio of each type of particles of the components [D] and [E] present within a range of up to 15% of the average thickness of the prepreg" contained in the evaluation methods described above and, as the result, the component [D] accounted for 95% by mass relative to the whole amount of the component [E] and the component [D] accounted for 99% by mass relative to the whole amount of the component [D]. The particle sizes of [D] and [E] were measured in accordance with "(IV) Measurement of particle size of each of components [D] and [E] in prepreg" and, as the result, the measured values were not different from the number-average particle sizes measured in accordance with "(I) Measurement of particle size of each of components [D] and [E]". For this reason, the number-average particle sizes measured in accordance with "(I) Measurement of particle size of each of components [D] and [E]" were used for the measurement of Examples 1 to 35 and Comparative Examples 1 to 7.

(Evaluation of Fiber Reinforced Composite Material Characteristics)

As a result of measurement of the thickness-direction conductivity and the CAI of a panel produced by preparing a fiber reinforced composite material using a resulting prepreg in accordance with "(X) Method for measuring conductivity of fiber reinforced composite material" and "(XI) Method for measuring compression after impact (CAI) of fiber reinforced composite material" contained in the evaluation methods described above, the thickness-direction volume resistivity was 2.6 Ωcm and CAI was 290 MPa.

Examples 2 to 35

A primary resin and a secondary resin, which were epoxy resin compositions, were prepared in the same manner as in Example 1 except that the compositions were changed as shown in Tables 1 to 5, and a prepreg was produced by a two stage impregnation hot melt process, and then a fiber reinforced composite material was prepared and various measurements were carried out.

The measured results are as shown in Tables 1 to 5; there were caused no problems on resin characteristics or prepreg characteristics even though materials or content ratios were varied within prescribed ranges as in Examples 2 to 35 and fiber reinforced composite materials excellent in thickness-direction conductivity and impact resistance were obtained.

Comparative Examples 1 to 7

A primary resin and a secondary resin, which were epoxy resin compositions, were prepared in the same manner as in Example 1 except that the compositions and the areal weight of carbon fibers of the component [A] were changed as shown in Table 6, and a prepreg was produced by a two stage impregnation hot melt process, and then a fiber reinforced composite material was prepared and various measurements were carried out.

Comparative Example 1 is free of the component [D]. The fiber reinforced composite material obtained in Comparative Example 1 is small in volume resistivity value with respect to the thickness direction, but it is low in compression after impact. Comparison with Examples 1 to 35 shows that inclusion of the component [D] has improved the compression after impact of the fiber reinforced composite materials obtained in Examples 1 to 35.

Comparative Examples 2 and 3 is free of either one of the components [E] and [F]. This has lead to larger volume resistivity values of fiber reinforced composite materials with respect to the thickness direction thereof. Comparison with Examples 1 to 35 shows that inclusion of both the components [E] and [F] has improved the thickness-direction conductivity of the fiber reinforced composite materials obtained in Examples 1 to 35.

Comparative Examples 4 and 5 contain both the components [D] and [E], but they do not satisfy formula (1). Comparison of Comparative Example 4 with Examples 1 to 35 shows that the fiber reinforced composite materials obtained in Examples 1 to 35 had increased thickness-direction conductivities due to satisfaction of formula (1). In addition, comparison of Comparative Example 5 with Examples 1 to 35 shows that the fiber reinforced composite materials obtained in Examples 1 to 35 had increased compressions after impact due to satisfaction of formula (1).

Comparative Examples 6 and 7 contain both the components [D] and [E] and also satisfy the formula (1), but the components [D] and [F] are hetero-aggregated and Ne/Nd is less than 0.25. The fiber reinforced composite materials obtained in Comparative Examples 6 and 7 are small in volume resistivity value with respect to the thickness direction of the fiber reinforced composite materials. Comparison with Examples 1 to 35 shows that the fiber reinforced composite materials obtained in Examples 1 to 35 have Ne/Nd of 0.25 or more and have been greatly improved in thickness-direction conductivity due to the fact that [D] and [F] satisfy formulae (2) to (4).

Comparison of Comparative Example 6 with Examples 34 and 35 shows that the fiber reinforced composite materials obtained in Examples 34 and 35 have been improved in Ne/Nd and have been greatly improved in thickness-direction conductivity due to the effect of the component [H].

TABLE 1

| | | | Example 1 | | | Example 2 | | | Example 3 | | | Example 4 | | |
|---|---|---|---|---|---|---|---|---|---|---|---|---|---|---|
| | | | Primary resin | Secondary resin | Total | Primary resin | Secondary resin | Total | Primary resin | Secondary resin | Total | Primary resin | Secondary resin | Total |
| Component [A] | | | | | | | | | | | | | | |
| Carbon fiber - "TORAYCA" T800S-24K-10E | | | — | — | ○ | — | — | ○ | — | — | ○ | — | — | ○ |
| Component [B] | | | | | | | | | | | | | | |
| Thermosetting resin (polyfunctional epoxy resin) "ARALDITE" MY721 | | | 60 | 60 | 60 | 60 | 60 | 60 | 60 | 60 | 60 | 60 | 60 | 60 |
| "jER" 360 | | | — | — | — | — | — | — | — | — | — | — | — | — |
| Thermosetting resin (epoxy resin having di-functionality) "ARALDITE" GY282 | | | 40 | 40 | 40 | 40 | 40 | 40 | 40 | 40 | 40 | 40 | 40 | 40 |
| GAN | | | — | — | — | — | — | — | — | — | — | — | — | — |
| Component [C] | | | | | | | | | | | | | | |
| Aromatic amine compound "SEIKACURE" S | | | 42 | 42 | 42 | 42 | 42 | 42 | 42 | 42 | 42 | 42 | 42 | 42 |
| Component [D] | | | | | | | | | | | | | | |
| Particles containing thermoplastic resin as primary component | Number-average particles size | | | | | | | | | | | | | | |
| Nylon 12 particles SP-10 | 10 μm | | — | — | — | — | — | — | — | — | — | — | — | — |
| Orgasol 1002D NAT1 | 20 μm | | — | — | — | — | — | — | — | — | — | — | — | — |
| Particles A | 13 μm | | — | 51.5 | 21.1 | — | 51.5 | 21.3 | — | 51.5 | 21.3 | — | 51 | 21.1 |
| Particles B | 13 μm | | — | — | — | — | — | — | — | — | — | — | — | — |
| Component [E] | | | | | | | | | | | | | | |
| Conductive particle | Number-average particle size | Volume resistivity | | | | | | | | | | | | | |
| Conductive particle A "Glassy Carbon" | 28 μm | $3.9 \times 10^{-2}$ Ωcm | — | 10.4 | 4.3 | — | 10.4 | 4.3 | — | 10.4 | 4.3 | — | 10.3 | 4.3 |
| "MICRO PEARL" AU225 | 26 μm | $4.2 \times 10^{-5}$ Ωcm | — | — | — | — | — | — | — | — | — | — | — | — |
| Conductive particle B | 25 μm | $1.4 \times 10^{-3}$ Ωcm | — | — | — | — | — | — | — | — | — | — | — | — |
| Conductive particle C | 36 μm | $3.9 \times 10^{-2}$ Ωcm | — | — | — | — | — | — | — | — | — | — | — | — |
| Conductive particle D | 33 μm | $3.9 \times 10^{-2}$ Ωcm | — | — | — | — | — | — | — | — | — | — | — | — |
| Conductive particle E | 20 μm | $3.9 \times 10^{-2}$ Ωcm | — | — | — | — | — | — | — | — | — | — | — | — |
| Component [F] | 16 μm | $3.9 \times 10^{-2}$ Ωcm | | | | | | | | | | | | | |
| Carbon black "Printex" L | | | 2.4 | 2.4 | 2.4 | — | — | — | 2.4 | — | 2.4 | — | — | — |
| "Printex" L6 | | | — | — | — | — | — | — | — | 2.4 | 2.4 | — | — | — |

TABLE 1-continued

| | C1 | C2 | C3 | C4 | C5 | C6 | C7 |
|---|---|---|---|---|---|---|---|
| "Printex"P | — | — | — | — | — | — | — |
| ECP600JD | — | — | — | — | — | — | — |
| #3230B | — | — | — | 2.4 | 2.4 | — | — |
| Component [G] | 16 | 16 | 16 | 16 | 16 | 16 | 16 |
| Thermoplastice resin having a polyaryl ether skeleton | | | | | | | |
| "VIRANTAGE" VW-10700RFP | | | | | | 0.8 | 0.8 |
| Resin characteristics | | | | | | | |
| Structure size (nm) of component [F] in component [B] | | 165 | 210 | | 180 | 210 | |
| Ne/Nd ratio | | 1.12 | 0.80 | | 1.30 | 0.67 | |
| Zetapotential | | | | | | | |
| Component [D]   mV | | 5 | 5 | | 5 | 5 | |
| Component [F]   mV | | −43 | −28 | | −39 | −28 | |
| Prepreg characteristics | | | | | | | |
| Areal weight (g/m²) of component [A] | | 192 | 192 | | 192 | 192 | |
| Presence or absence of component [A] in the ranges extending up to 13% of the average thickness of the prepreg from each surface of the prepreg | | Absent | Absent | | Absent | Absent | |
| Amount (% by mass) of component [D] present in the ranges corresponding to up to 15% of the average thickness of the prepreg from each surface of the prepreg | | 97 | 98 | | 97 | 97 | |
| Amount (% by mass) of component [E] present in the ranges corresponding to up to 15% of the average thickness of the prepreg from each surface of the prepreg | | 99 | 99 | | 99 | 99 | |
| Volume content VF (% by volume) of carbon fibers | | 57 | 59 | | 57 | 59 | |
| Characteristics of fiber reinforced composite material | | | | | | | |
| Compression after impact CAI (MPa) | | 290 | 297 | | 295 | 306 | |
| Volume resistivity (Ohmcm) | | 2.6 | 2.4 | | 2.4 | 2.7 | |

TABLE 1-continued

| | | | Example 5 | | | Example 6 | | | Example 7 | | |
|---|---|---|---|---|---|---|---|---|---|---|---|
| | | | Primary resin | Secondary resin | Total | Primary resin | Secondary resin | Total | Primary resin | Secondary resin | Total |
| Component [A] Carbon fiber - "TORAYCA" T800S-24K-10E | | | — | — | ○ | — | — | ○ | — | — | ○ |
| Component [B] Thermosetting resin (polyfunctional epoxy resin) "ARALDITE"MY721 | | | 60 | 60 | 60 | 60 | 60 | 60 | 60 | 60 | 60 |
| "jER"360 | | | — | — | — | — | — | — | — | — | — |
| Thermosetting resin (epoxy resin having di-functionality) "ARALDITE"GY282 | | | 40 | 40 | 40 | 40 | 40 | 40 | 40 | 40 | 40 |
| GAN | | | — | — | — | — | — | — | — | — | — |
| Component [C] Aromatic amine compound - "SEIKACURE" S | | | 42 | 42 | 42 | 42 | 42 | 42 | 42 | 42 | 42 |
| Component [D] Particles containing thermoplastic resin as primary component | Number-average particles size | | | | | | | | | | |
| Nylon 12 particles SP-10 | 10 μm | | — | — | — | — | — | — | — | — | — |
| Orgasol 1002D NAT1 | 20 μm | | — | — | — | — | — | — | — | — | — |
| Particles A | 13 μm | | — | 52.2 | 21.6 | — | 54 | 22.4 | — | 51 | 21.1 |
| Particles B | 13 μm | | — | — | — | — | — | — | — | — | — |
| Component [E] Conductive particle | Number-average particle size | Volume resistivity | | | | | | | | | |
| Conductive particle A | 28 μm | 3.9 × 10⁻² Ωcm | — | 10.5 | 4.4 | — | 10.9 | 4.5 | — | 10.3 | 4.3 |
| "Glassy Carbon" | 26 μm | 4.2 × 10⁻⁵ Ωcm | — | — | — | — | — | — | — | — | — |
| "MICRO PEARL ""AU225" | 25 μm | 1.4 × 10⁻³ Ωcm | — | — | — | — | — | — | — | — | — |
| Conductive particle B | 36 μm | 3.9 × 10⁻² Ωcm | — | — | — | — | — | — | — | — | — |
| Conductive particle C | 33 μm | 3.9 × 10⁻² Ωcm | — | — | — | — | — | — | — | — | — |
| Conductive particle D | 20 μm | 3.9 × 10⁻² Ωcm | — | — | — | — | — | — | — | — | — |
| Conductive particle E | 16 μm | 3.9 × 10⁻² Ωcm | — | — | — | — | — | — | — | — | — |
| Component [F] Carbon black | | | | | | | | | | | |
| "Printex"L | | | — | — | — | — | — | — | 0.8 | 0.8 | 0.8 |
| "Printex"L6 | | | — | — | — | — | — | — | — | — | — |
| "Printex"P | | | — | — | — | — | — | — | — | — | — |
| ECP600JD | | | 4.9 | 4.9 | 4.9 | 15 | 15 | 15 | — | — | — |
| #3230B | | | — | — | — | — | — | — | — | — | — |

TABLE 1-continued

| | | | | | | | |
|---|---|---|---|---|---|---|---|
| Component [G] | | | | | | | |
| Thermoplastice resin having a polyaryl ether skeleton "VIRANTAGE" VW-10700RFP | 16 | 16 | 16 | 16 | 16 | 16 | 16 |
| Resin characteristics | | | | | | | |
| Structure size (nm) of component [F] in component [B] | | 210 | | 210 | | 180 | |
| Ne/Nd ratio | | 1.40 | | 0.93 | | 1.19 | |
| Zetapotential | | | | | | | |
| Component [D]  mV | | 5 | | 5 | | 5 | |
| Component [F]  mV | | −28 | | −28 | | −39 | |
| Prepreg characteristics | | | | | | | |
| Areal weight (g/m²) of component [A] | | 192 | | 192 | | 192 | |
| Presence or absence of component [A] in the ranges extending up to 13% of the average thickness of the prepreg from each surface of the prepreg | | Absent | | Absent | | Absent | |
| Amount (% by mass) of component [D] present in the ranges corresponding to up to 15% of the average thickness of the prepreg from each surface of the prepreg | | 97 | | 97 | | 97 | |
| Amount (% by mass) of component [E] present in the ranges corresponding to up to 15% of the average thickness of the prepreg from each surface of the prepreg | | 99 | | 99 | | 99 | |
| Volume content VF (% by volume) of carbon fibers | | 59 | | 59 | | 56 | |
| Characteristics of fiber reinforced composite material | | | | | | | |
| Compression after impact CAI (MPa) | | 288 | | 281 | | 309 | |
| Volume resistivity (Ohmcm) | | 2.4 | | 1.9 | | 2.7 | |

TABLE 2

| | | | Example 8 | | | Example 9 | | | Example 10 | | | Example 11 | | |
|---|---|---|---|---|---|---|---|---|---|---|---|---|---|---|
| | | | Primary resin | Secondary resin | Total | Primary resin | Secondary resin | Total | Primary resin | Secondary resin | Total | Primary resin | Secondary resin | Total |
| Component [A] | Carbon fiber | | | | | | | | | | | | | |
| | "TORAYCA" T800S-24K-10E | | — | — | ○ | — | — | ○ | — | — | ○ | — | — | ○ |
| Component [B] | Thermosetting resin (polyfunctional epoxy resin) | | | | | | | | | | | | | |
| | "ARALDITE"MY721 | | 60 | 60 | 60 | 60 | 60 | 60 | 60 | 60 | 60 | 60 | 60 | 60 |
| | "jER"630 | | — | — | — | — | — | — | — | — | — | — | — | — |
| | Thermosetting resin (epoxy resin having di-functionality) | | | | | | | | | | | | | |
| | "ARALDITE"GY282 | | 40 | 40 | 40 | 40 | 40 | 40 | 40 | 40 | 40 | 40 | 40 | 40 |
| Component [C] | Aromatic amine compound | | | | | | | | | | | | | |
| | "SEIKACURE"S | | 42 | 42 | 42 | 42 | 42 | 42 | 42 | 42 | 42 | 42 | 42 | 42 |
| Component [D] | Particles containing thermoplastic resin as primary component | Number-average particle size | | | | | | | | | | | | | |
| | Nylon 12 particles SP-10 | 10 μm | — | — | — | — | — | — | — | — | — | — | — | — |
| | Orgasol1002D NAT1 | 20 μm | — | — | — | — | — | — | — | — | — | — | — | — |
| | Particles A | 13 μm | — | 52.2 | 21.6 | — | 54.0 | 22.4 | — | 53.4 | 22.1 | — | 53.4 | 22.1 |
| | Particles B | 13 μm | — | — | — | — | — | — | — | — | — | — | — | — |
| Component [E] | Conductive particle | Number-average particle size | Volume resistivity | | | | | | | | | | | | |
| | Conductive particle A | 28 μm | $3.9 \times 10^{-2}$ Ωcm | — | 10.5 | 4.4 | — | 10.9 | 4.5 | — | 10.8 | 4.5 | — | 10.8 | 4.5 |
| | "Glassy Carbon" | 26 μm | $4.2 \times 10^{-5}$ Ωcm | — | — | — | — | — | — | — | — | — | — | — | — |
| | "MICRO PEARL" AU225 | 25 μm | $1.4 \times 10^{-3}$ Ωcm | — | — | — | — | — | — | — | — | — | — | — | — |
| | Conductive particle B | 36 μm | $3.9 \times 10^{-2}$ Ωcm | — | — | — | — | — | — | — | — | — | — | — | — |
| | Conductive particle C | 33 μm | $3.9 \times 10^{-2}$ Ωcm | — | — | — | — | — | — | — | — | — | — | — | — |
| | Conductive particle D | 20 μm | $3.9 \times 10^{-2}$ Ωcm | — | — | — | — | — | — | — | — | — | — | — | — |
| | Conductive particle E | 16 μm | $3.9 \times 10^{-2}$ Ωcm | — | — | — | — | — | — | — | — | — | — | — | — |

TABLE 2-continued

| | | | | | | | | | |
|---|---|---|---|---|---|---|---|---|---|
| Component [F] | Carbon black | | | | | | | | |
| | "Printex"L | 4.9 | — | — | — | — | — | — | — |
| | "Printex"L6 | — | 4.9 | 4.9 | — | — | — | — | — |
| | "Printex"P | — | — | — | 15 | 15 | 15 | — | — |
| | ECP600JD #3230B | — | — | — | — | — | — | 8.3 | 8.3 | 8.3 | 8.3 |
| Component [G] | Thermoplastic resin having a polyarylether skeleton | | | | | | | | |
| | "VIRANTAGE"VW-10700RFP | 16 | 16 | 16 | 16 | 16 | 16 | 16 | 16 |
| Resin characteristics | Structure size (nm) of component [F] in component [B] | 180 | 180 | | | 155 | | 165 | |
| | Ne/Nd ratio | 1.47 | 1.53 | | | 0.26 | | 2.28 | |
| Zeta-potential | Component [D]mV | 5 | 5 | | | 55 | | −29 | |
| | Component [F]mV | −39 | −39 | | | −9 | | −39 | |
| Prepreg characteristics | Areal weight (g/m²) of component [A] | 192 | 192 | | | 192 | | 192 | |
| | Presence or absence of component [A] in the ranges extending up to 13% of the average thickness of the prepreg from each surface of the prepreg | Absent | Absent | | | Absent | | Absent | |
| | Amount (% by mass) of component [D] present in the ranges corresponding to up to 15% of the average thickness of the prepreg from each surface of the prepreg | 97 | 97 | | | 97 | | 98 | |
| | Amount (% by mass) of component [E] present in the ranges corresponding to up to 15% of the average thickness of the prepreg from each surface of the prepreg | 99 | 99 | | | 99 | | 99 | |
| Characteristics of fiber reinforced composite material | Volume content Vf (% by volume) of carbon fibers | 56 | 57 | | | 59 | | 57 | |
| | Compression after impact CAI (MPa) | 283 | 280 | | | 304 | | 286 | |
| | Volume resistivity (Ohm·cm) | 2.3 | 1.9 | | | 2.6 | | 1.9 | |

TABLE 2-continued

|  |  | Example 12 ||| Example 13 ||| Example 14 |||
| --- | --- | --- | --- | --- | --- | --- | --- | --- | --- | --- |
|  |  | Primary resin | Secondary resin | Total | Primary resin | Secondary resin | Total | Primary resin | Secondary resin | Total |
| Component [A] | Carbon fiber "TORAYCA" T800S-24K-10E |  |  | ○ |  |  | ○ |  |  | ○ |
| Component [B] | Thermosetting resin (polyfunctional epoxy resin) "ARALDITE"MY721 "jER"630 | — 60 | 60 — | 60 — | — 60 | 60 — | 60 — | — 60 | 60 — | 60 — |
|  | Thermosetting resin (epoxy resin having di-functionality) "ARALDITE"GY282 | 40 — | 40 — | 40 — | 40 — | 40 — | 40 — | 40 — | 40 — | 40 — |
| Component [C] | Aromatic amine compound "SEIKACURE"S | 42 | 42 | 42 | 42 | 42 | 42 | 42 | 42 | 42 |
| Component [D] | Particles containing thermoplastic resin as primary component | Number-average particle size |  |  |  |  |  |  |  |  |
|  | Nylon 12 particles SP-10 | 10 μm | — | — | — | — | — | — | — | — | — |
|  | Orgasol1002D NAT1 | 20 μm | — | — | — | — | — | — | — | — | — |
|  | Particles A | 13 μm | — | 36 | 15.5 | — | 84 | 32 | — | 36 | 15.5 |
|  | Particles B | 13 μm | — | — | — | — | 53.4 | 22.1 | — | — | — |
| Component [E] | Conductive particle | Number-average particle size | Volume resistivity |  |  |  |  |  |  |  |
|  | Conductive particle A | 28 μm | $3.9 \times 10^{-2}$ Ωcm | — | 10.4 | 4.5 | — | 10.4 | 4.1 | — | 10.4 | 4.5 |
|  | "Glassy Carbon" AU225 | 26 μm | $4.2 \times 10^{-5}$ Ωcm | — | — | — | — | — | — | — | — | — |
|  | "MICRO PEARL" | 25 μm | $1.4 \times 10^{-3}$ Ωcm | — | — | — | — | — | — | — | — | — |
|  | Conductive particle B | 36 μm | $3.9 \times 10^{-2}$ Ωcm | — | — | — | — | — | — | — | — | — |
|  | Conductive particle C | 33 μm | $3.9 \times 10^{-2}$ Ωcm | — | — | — | — | — | — | — | — | — |
|  | Conductive particle D | 20 μm | $3.9 \times 10^{-2}$ Ωcm | — | — | — | — | — | — | — | — | — |
|  | Conductive particle E | 16 μm | $3.9 \times 10^{-2}$ Ωcm | — | — | — | — | — | — | — | — | — |
| Component [F] | Carbon black "Printex"L "Printex"L6 |  |  | — — | — — | — — | — — | — — | — — | 2.4 — | 2.4 — | 2.4 — |

TABLE 2-continued

| | | 1 | 2 | 3 | 4 | 5 | 6 | 7 | 8 |
|---|---|---|---|---|---|---|---|---|---|
| Component [G] | "Printex"P ECP600JD #3230B | 2.4 | — | — | — | — | — | — | — |
| | "VIRANTAGE"VW-10700RFP | — | 2.4 | — | — | — | — | — | — |
| | Thermoplastice resin having a polyarylether skeleton | — | — | 2.4 | 2.4 | 2.4 | 2.4 | — | — |
| Resin characteristics | Structure size (nm) of component [B] | 16 | 16 | 16 | 16 | 16 | 16 | 16 | 16 |
| | Ne/Nd ratio | | 210 | | 210 | | | | 180 |
| Zeta-potential | Component [D]mV | | 0.6 | | 1.03 | | | | 1.12 |
| | Component [F]mV | | 5 | | 5 | | | | 5 |
| Prepreg characteristics | Component [D]mV | | −28 | | −28 | | | | −39 |
| | Areal weight (g/m²) of component [A] | | 192 | | 192 | | | | 192 |
| | Presence or absence of component [A] in the ranges extending up to 13% of the average thickness of the prepreg from each surface of the prepreg | | Absent | | Absent | | | | Absent |
| | Amount (% by mass) of component [D] present in the ranges corresponding to up to 15% of the average thickness of the prepreg from each surface of the prepreg | | 97 | | 97 | | | | 97 |
| | Amount (% by mass) of component [E] present in the ranges corresponding to up to 15% of the average thickness of the prepreg from each surface of the prepreg | | 99 | | 99 | | | | 99 |
| Characteristics of fiber reinforced composite material | Volume content Vf (% by volume) of carbon fibers | | 57 | | 58 | | | | 57 |
| | Compression after impact CAI (MPa) | | 242 | | 325 | | | | 240 |
| | Volume resistivity (Ohmcm) | | 2.6 | | 2.8 | | | | 2.5 |

TABLE 3

| | | Example 15 | | | Example 16 | | | Example 17 | | | Example 18 | | |
|---|---|---|---|---|---|---|---|---|---|---|---|---|---|
| | | Primary resin | Secondary resin | Total | Primary resin | Secondary resin | Total | Primary resin | Secondary resin | Total | Primary resin | Secondary resin | Total |
| Component [A] | Carbon fiber "TORAYCA" T800S-24K-10E | — | — | ○ | — | — | ○ | — | — | ○ | — | — | ○ |
| Component [B] | Thermosetting resin (polyfunctional epoxy resin) "ARALDITE"MY721 | 60 | 60 | 60 | 60 | 60 | 60 | 60 | 60 | 60 | 60 | 60 | 60 |
| | "jER"630 Thermosetting resin (epoxy resin having di-functionality) | — | — | — | — | — | — | — | — | — | — | — | — |
| | "ARALDITE"GY282 | 40 | 40 | 40 | 40 | 40 | 40 | 40 | 40 | 40 | 40 | 40 | 40 |
| Component [C] | Aromatic amine compound "SEIKACURE"S | 42 | 42 | 42 | 42 | 42 | 42 | 42 | 42 | 42 | 42 | 42 | 42 |
| Component [D] | Particles containing thermoplastic resin as primary component | Number-average particle size | | | | | | | | | | | |
| | Nylon 12 particles SP-10 | 10 μm | — | — | — | — | — | — | — | — | — | — | — | — |
| | Orgasoll1002D NAT1 | 20 μm | — | — | — | — | — | — | — | — | — | — | — | — |
| | Particles A | 13 μm | — | 84 | 32 | — | 51.5 | 23.3 | — | 51.5 | 21.3 | — | 51.5 | 21.3 |
| | Particles B | 13 μm | — | — | — | — | — | — | — | — | — | — | — | — |
| Component [E] | Conductive particle | Number-average particle size | Volume resistivity | | | | | | | | | | |
| | Conductive particle A | 28 μm | 3.9 × 10⁻² Ωcm | — | 10.4 | 4.1 | — | — | — | — | — | — | — | — |
| | "Glassy Carbon" "MICRO PEARL" AU225 | 26 μm 25 μm | 4.2 × 10⁻⁵ Ωcm 1.4 × 10⁻³ Ωcm | — | — | — | — | 10.4 | 4.3 | — | 10.4 | 4.3 | — | 10.4 | 4.3 |
| | Conductive particle B | 36 μm | 3.9 × 10⁻² Ωcm | — | — | — | — | — | — | — | — | — | — | — |
| | Conductive particle C | 33 μm | 3.9 × 10⁻² Ωcm | — | — | — | — | — | — | — | — | — | — | — |
| | Conductive particle D | 20 μm | 3.9 × 10⁻² Ωcm | — | — | — | — | — | — | — | — | — | — | — |
| | Conductive particle E | 16 μm | 3.9 × 10⁻² Ωcm | — | — | — | — | — | — | — | — | — | — | — |

TABLE 3-continued

| Component [F] | Carbon black | | | | | | | | | | |
|---|---|---|---|---|---|---|---|---|---|---|---|
| | "Printex"L | 2.4 | — | — | — | — | — | — | — | — | — |
| | "Printex"L6 | — | 2.4 | 2.4 | — | — | — | — | — | — | — |
| | "Printex"P | — | — | — | — | — | — | 2.4 | 2.4 | — | — |
| | ECP600JD | — | — | — | 2.4 | 2.4 | — | — | — | — | — |
| | #3230B | — | — | — | — | — | 2.4 | — | — | 2.4 | 2.4 |
| Component [G] | Thermoplastice resin having a polyarylether skeleton "VIRANTAGE"VW-10700RFP | 16 | 16 | 16 | 16 | 16 | 16 | 16 | 16 | 16 | 16 |
| Resin characteristics | Structure size (nm) of component [F] | 180 | | | 210 | | 210 | | | 180 | |
| | Ne/Nd ratio | 1.54 | | | 0.65 | | 0.58 | | | 1.19 | |
| Zeta-potential | Component [D]mV | 5 | | | 5 | | 5 | | | 5 | |
| | Component [F]mV | −39 | | | −28 | | −28 | | | −39 | |
| Prepreg characteristics | Areal weight (g/m²) of component [A] | 192 | | | 192 | | 192 | | | 192 | |
| | Presence or absence of component [A] in the ranges extending up to 13% of the average thickness of the prepreg from each surface of the prepreg | Absent | | | Absent | | Absent | | | Absent | |
| | Amount (% by mass) of component [D] present in the ranges corresponding to up to 15% of the average thickness of the prepreg from each surface of the prepreg | 97 | | | 98 | | 97 | | | 98 | |
| | Amount (% by mass) of component [E] present in the ranges corresponding to up to 15% of the average thickness of the prepreg from each surface of the prepreg | 99 | | | 99 | | 99 | | | 99 | |
| Characteristics of fiber reinforced composite material | Volume content Vf (% by volume) of carbon fibers | 57 | | | 58 | | 59 | | | 57 | |
| | Compression after impact CAI (MPa) | 316 | | | 294 | | 298 | | | 292 | |
| | Volume resistivity (Ohmcm) | 2.8 | | | 2.3 | | 2.9 | | | 2.4 | |

TABLE 3-continued

|  |  |  |  | Example 19 | | | Example 20 | | | Example 21 | | |
| --- | --- | --- | --- | --- | --- | --- | --- | --- | --- | --- | --- | --- |
|  |  |  |  | Primary resin | Secondary resin | Total | Primary resin | Secondary resin | Total | Primary resin | Secondary resin | Total |
| Component [A] | Carbon fiber | "TORAYCA" T800S-24K-10E |  | — | — | ◯ | — | — | ◯ | — | — | ◯ |
| Component [B] | Thermosetting resin (polyfunctional epoxy resin) | "ARALDITE"MY721 "jER"630 | | 60 — | 60 — | 60 — | 60 — | 60 — | 60 — | 60 — | 60 — | 60 — |
|  | Thermosetting resin (epoxy resin having di-functionality) | | | 40 — | 40 — | 40 — | 40 — | 40 — | 40 — | 40 — | 40 — | 40 — |
| Component [C] | Aromatic amine compound | "ARALDITE"GY282 GAN | | 42 — | 42 — | 42 — | 42 — | 42 — | 42 — | 42 — | 42 — | 42 — |
| Component [D] | Particles containing thermoplastic resin as primary component | | Number-average particle size | | | | | | | | | |
|  | Nylon 12 particles SP-10 | | 10 μm | — — | — — | — — | — — | — — | — — | — — | — — | — — |
|  | Orgasol1002D NAT1 | | 20 μm | — — | — — | — — | — — | — — | — — | — — | — — | — — |
|  | Particles A | | 13 μm | — — | 51.5 — | 21.3 — | — — | 51.5 53.4 | 21.3 22.1 | — — | 51.5 — | 21.3 — |
|  | Particles B | | 13 μm | — — | — — | — — | — — | — — | — — | — — | — — | — — |
| Component [E] | Conductive particle | | Number-average particle size | Volume resistivity | | | | | | | | |
|  | Conductive particle A | | 28 μm | $3.9 \times 10^{-2}$ Ωcm | — — | — — | — — | — — | — — | — — | — — | — — | — — |
|  | "Glassy Carbon" | | 26 μm | $4.2 \times 10^{-5}$ Ωcm | — — | 10.4 — | 4.3 — | — — | 1.2 — | 0.5 — | — — | 18 — | 7.3 — |
|  | "MICRO PEARL" AU225 | | 25 μm | $1.4 \times 10^{-3}$ Ωcm | — — | — — | — — | — — | — — | — — | — — | — — | — — |
|  | Conductive particle B | | 36 μm | $3.9 \times 10^{-2}$ Ωcm | — — | — — | — — | — — | — — | — — | — — | — — | — — |
|  | Conductive particle C | | 33 μm | $3.9 \times 10^{-2}$ Ωcm | — — | — — | — — | — — | — — | — — | — — | — — | — — |
|  | Conductive particle D | | 20 μm | $3.9 \times 10^{-2}$ Ωcm | — — | — — | — — | — — | — — | — — | — — | — — | — — |
|  | Conductive particle E | | 16 μm | $3.9 \times 10^{-2}$ Ωcm | — — | — — | — — | — — | — — | — — | — — | — — | — — |
| Component [F] | Carbon black | "Printex"L | | | 2.4 — | 2.4 — | 2.4 — | 2.4 — | 2.4 — | 2.4 — | 2.4 — | 2.4 — | 2.4 — |
|  | | "Printex"L6 | | | — | — | — | — | — | — | — | — | — |

TABLE 3-continued

| | | | | | | | | | | | | | | | | |
|---|---|---|---|---|---|---|---|---|---|---|---|---|---|---|---|---|
| Component [G] | "Printex"P ECP600JD #3230B | 16 | — | — | — | 16 | — | — | — | 16 | — | — | — | 16 | — | — |
| | "VIRANTAGE"VW-10700RFP | — | — | — | — | — | — | — | — | — | — | — | — | — | — | — |
| | Thermoplastice resin having a polyarylether skeleton | — | — | — | — | — | — | — | — | — | — | — | — | — | — | — |
| Resin characteristics | Structure size (nm) of component [F] in component [B] | 180 | | | | 165 | | | | | | | | 165 | | |
| | Ne/Nd ratio | 1.05 | | | | 1.34 | | | | | | | | 1.05 | | |
| Zeta-potential | Component [D]mV | 5 | | | | 5 | | | | | | | | 5 | | |
| | Component [F]mV | −39 | | | | −43 | | | | | | | | −43 | | |
| Prepreg characteristics | Areal weight (g/m²) of component [A] | 192 | | | | 192 | | | | | | | | 192 | | |
| | Presence or absence of component [A] in the ranges extending up to 13% of the average thickness of the prepreg from each surface of the prepreg | Absent | | | | Absent | | | | | | | | Absent | | |
| | Amount (% by mass) of component [D] present in the ranges corresponding to up to 15% of the average thickness of the prepreg from each surface of the prepreg | 97 | | | | 97 | | | | | | | | 97 | | |
| | Amount (% by mass) of component [E] present in the ranges corresponding to up to 15% of the average thickness of the prepreg from each surface of the prepreg | 99 | | | | 99 | | | | | | | | 99 | | |
| Characteristics of fiber reinforced composite material | Volume content Vf (% by volume) of carbon fibers | 58 | | | | 57 | | | | | | | | 57 | | |
| | Compression after impact CAI (MPa) | 296 | | | | 302 | | | | | | | | 295 | | |
| | Volume resistivity (Ohmcm) | 2.9 | | | | 3.2 | | | | | | | | 2.4 | | |

TABLE 4

| | | | Example 22 | | | Example 23 | | | Example 24 | | | Example 25 | | |
|---|---|---|---|---|---|---|---|---|---|---|---|---|---|---|
| | | | Primary resin | Secondary resin | Total | Primary resin | Secondary resin | Total | Primary resin | Secondary resin | Total | Primary resin | Secondary resin | Total |
| Component [A] | Carbon fiber | "TORAYCA" T800S-24K-10E | — | — | ○ | — | — | ○ | — | — | ○ | — | — | ○ |
| Component [B] | Thermosetting resin (polyfunctional epoxy resin) | "ARALDITE"MY721 | 60 | 60 | 60 | 60 | 60 | 60 | 60 | 60 | 60 | 60 | 60 | 60 |
| | | "jER"630 | — | — | — | 40 | 40 | 40 | — | — | — | 40 | 40 | 40 |
| | Thermosetting resin (epoxy resin having di-functionality) | "ARALDITE"GY282 | 40 | 40 | 40 | — | — | — | — | — | — | — | — | — |
| Component [C] | Aromatic amine compound | GAN | — | — | — | — | — | — | 40 | 40 | 40 | — | — | — |
| Component [D] | Particles containing thermoplastic resin as primary component | "SEIKACURE"S | 42 | 42 | 42 | 48 | 48 | 48 | 47 | 47 | 47 | 48 | 48 | 48 |
| | | Number-average particle size | | | | | | | | | | | | |
| | | Nylon 12 particles SP-10 | 10 μm | — | — | — | — | — | — | — | — | — | — | — | — |
| | | Orgasoll002D NAT1 | 20 μm | — | — | — | — | — | — | — | — | — | — | — | — |
| | | Particles A | 13 μm | — | 51.5 | 21.3 | — | 55 | 22.7 | — | 53 | 22 | — | 55 | 22.7 |
| | | Particles B | 13 μm | — | — | — | — | — | — | — | — | — | — | — | — |
| Component [E] | Conductive particle | Number-average particle size | Volume resistivity | | | | | | | | | | | |
| | Conductive particle A | 28 μm | $3.9 \times 10^{-2}$ Ωcm | — | — | — | — | 11 | 4.5 | — | 10.7 | 4.4 | — | 11 | 4.5 |
| | "Glassy Carbon" | 26 μm | $4.2 \times 10^{-5}$ Ωcm | — | 26.5 | 10.5 | — | — | — | — | — | — | — | — | — |
| | "MICRO PEARL" AU225 | 25 μm | $1.4 \times 10^{-3}$ Ωcm | — | — | — | — | — | — | — | — | — | — | — | — |
| | Conductive particle B | 36 μm | $3.9 \times 10^{-2}$ Ωcm | — | — | — | — | — | — | — | — | — | — | — | — |
| | Conductive particle C | 33 μm | $3.9 \times 10^{-2}$ Ωcm | — | — | — | — | — | — | — | — | — | — | — | — |
| | Conductive particle D | 20 μm | $3.9 \times 10^{-2}$ Ωcm | — | — | — | — | — | — | — | — | — | — | — | — |
| | Conductive particle E | 16 μm | $3.9 \times 10^{-2}$ Ωcm | — | — | — | — | — | — | — | — | — | — | — | — |

TABLE 4-continued

| | | | | | | | | | | |
|---|---|---|---|---|---|---|---|---|---|---|
| Component [F] | Carbon black | | | | | | | | | |
| | "Printex"L | 2.4 | 2.4 | — | — | — | — | — | — | — |
| | "Printex"L6 | — | — | 2.4 | — | — | — | — | — | — |
| | "Printex"P | — | — | — | 2.5 | — | — | — | — | — |
| | ECP600JD | — | — | — | — | 2.5 | 2.5 | 2.5 | 2.5 | — |
| | #3230B | — | — | — | — | — | — | — | — | 2.5 |
| Component [G] | Thermoplastice resin having a polyarylether skeleton | | | | | | | | | |
| | "VIRANTAGE"VW-10700RFP | 16 | 16 | 16 | 16 | 16 | 16 | 16 | 16 | 16 |
| Resin characteristics | Structure size (nm) of component [F] in component [B] | 165 | | | 180 | 180 | | 180 | 210 | |
| | Ne/Nd ratio | 1.34 | | | 1.29 | | | 1.27 | 0.81 | |
| Zeta-potential | Component [D]mV | 5 | | | 5 | | | 5 | 5 | |
| | Component [F]mV | −43 | | | −39 | | | −39 | −28 | |
| Prepreg characteristics | Areal weight (g/m²) of component [A] | 192 | | | 192 | | | 192 | 192 | |
| | Presence or absence of component [A] in the ranges extending up to 13% of the average thickness of the prepreg from each surface of the prepreg | Absent | | | Absent | | | Absent | Absent | |
| | Amount (% by mass) of component [D] present in the ranges corresponding to up to 15% of the average thickness of the prepreg from each surface of the prepreg | 97 | | | 97 | | | 97 | 97 | |
| | Amount (% by mass) of component [E] present in the ranges corresponding to up to 15% of the average thickness of the prepreg from each surface of the prepreg | 99 | | | 99 | | | 99 | 99 | |
| Characteristics of fiber reinforced composite material | Volume content Vf (% by volume) of carbon fibers | 57 | | | 57 | | | 57 | 59 | |
| | Compression after impact CAI (MPa) | 288 | | | 304 | | | 288 | 306 | |
| | Volume resistivity (Ohmcm) | 2.2 | | | 2.4 | | | 2.4 | 2.5 | |

TABLE 4-continued

|  |  |  |  | Example 26 | | | Example 27 | | | Example 28 | | |
|---|---|---|---|---|---|---|---|---|---|---|---|---|
|  |  |  |  | Primary resin | Secondary resin | Total | Primary resin | Secondary resin | Total | Primary resin | Secondary resin | Total |
| Component [A] | Carbon fiber | "TORAYCA" T800S-24K-10E |  | — | — | □ | — | — | □ | — | — | □ |
| Component [B] | Thermosetting resin (polyfunctional epoxy resin) | "ARALDITE"MY721 "jER"630 | | 60 — | 60 — | 60 — | — — | 60 — | 60 — | 60 — | 60 — | 60 — |
|  | Thermosetting resin (epoxy resin having di-functionality) | "ARALDITE"GY282 | | 40 | 40 | 40 | 40 | 40 | 40 | 40 | 40 | 40 |
| Component [C] | Aromatic amine compound | GAN "SEIKACURE"S | | — 47 | — 47 | — 47 | — 42 | — 42 | — 42 | — 42 | — 42 | — 42 |
| Component [D] | Particles containing thermoplastic resin as primary component | | Number-average particle size | | | | | | | | | |
|  | Nylon 12 particles SP-10 | | 10 μm | — | — | — | — | — | — | — | — | — |
|  | Orgasoll002D NAT1 | | 20 μm | — | — | — | — | — | — | — | — | — |
|  | Particles A | | 13 μm | — | 53 | 22 | — | 51.5 | 21.3 | — | 51.5 | 21.3 |
|  | Particles B | | 13 μm | — | — | — | — | — | — | — | — | — |
| Component [E] | Conductive particle | | Number-average particle size | Volume resistivity | | | | | | | | |
|  | Conductive particle A | | 28 μm | $3.9 \times 10^{-2}$ Ωcm | — | 10.7 | 4.4 | — | 10.4 | 4.3 | — | 10.4 | 4.3 |
|  | "Glassy Carbon" | | 26 μm | $4.2 \times 10^{-5}$ Ωcm | — | — | — | — | — | — | — | — | — |
|  | "MICRO PEARL" AU225 | | 25 μm | $1.4 \times 10^{-3}$ Ωcm | — | — | — | — | — | — | — | — | — |
|  | Conductive particle B | | 36 μm | $3.9 \times 10^{-2}$ Ωcm | — | — | — | — | — | — | — | — | — |
|  | Conductive particle C | | 33 μm | $3.9 \times 10^{-2}$ Ωcm | — | — | — | — | — | — | — | — | — |
|  | Conductive particle D | | 20 μm | $3.9 \times 10^{-2}$ Ωcm | — | — | — | — | — | — | — | — | — |
|  | Conductive particle E | | 16 μm | $3.9 \times 10^{-2}$ Ωcm | — | — | — | — | — | — | — | — | — |
| Component [F] | Carbon black | "Printex"L "Printex"L6 | | | — — | — — | — — | — 2.4 | — 2.4 | — 2.4 | 2.4 — | 2.4 — | 2.4 — |

TABLE 4-continued

| | | | | | | | | | | |
|---|---|---|---|---|---|---|---|---|---|---|
| Component [G] | "Printex"P ECP600JD #3230B | 2.5 | — | 2.5 | 2.5 | — | — | — | — | — |
| | Thermoplastice resin having a polyarylether skeleton | — | — | — | — | — | — | — | — | — |
| | "VIRANTAGE"VW-10700RFP | — | 16 | — | — | 16 | 16 | 16 | 16 | 16 |
| Resin characteristics | Structure size (nm) of component [F] in component [B] | | | 210 | | | 420 | | 120 | |
| | Ne/Nd ratio | | | 0.84 | | | 1.61 | | 1.16 | |
| Zeta-potential | Component [D]mV | | | 5 | | | 5 | | 5 | |
| | Component [F]mV | | | −28 | | | −39 | | −39 | |
| Prepreg characteristics | Areal weight (g/m²) of component [A] | | | 192 | | | 192 | | 192 | |
| | Presence or absence of component [A] in the ranges extending up to 13% of the average thickness of the prepreg from each surface of the prepreg | | | Absent | | | Absent | | Absent | |
| | Amount (% by mass) of component [D] present in the ranges corresponding to up to 15% of the average thickness of the prepreg from each surface of the prepreg | | | 97 | | | 97 | | 97 | |
| | Amount (% by mass) of component [E] present in the ranges corresponding to up to 15% of the average thickness of the prepreg from each surface of the prepreg | | | 99 | | | 99 | | 99 | |
| Characteristics of fiber reinforced composite material | Volume content Vf (% by volume) of carbon fibers | | | 59 | | | 59 | | 57 | |
| | Compression after impact CAI (MPa) | | | 292 | | | 288 | | 301 | |
| | Volume resistivity (Ohmcm) | | | 2.5 | | | 2.1 | | 2.8 | |

TABLE 5

| | | Example 29 | | | Example 30 | | | Example 31 | | | Example 32 | | |
|---|---|---|---|---|---|---|---|---|---|---|---|---|---|
| | | Primary resin | Secondary resin | Total | Primary resin | Secondary resin | Total | Primary resin | Secondary resin | Total | Primary resin | Secondary resin | Total |
| Component [A] | Carbon fiber "TORAYCA" T800S-24K-10E | — | — | ◯ | — | — | ◯ | — | — | ◯ | — | — | ◯ |
| Component [B] | Thermosetting resin (polyfunctional epoxy resin) "ARALDITE"MY721 | 60 | 60 | 60 | 60 | 60 | 60 | 60 | 60 | 60 | 60 | 60 | 60 |
| | "jER"630 Thermosetting resin (epoxy resin having di-functionality) | — | — | — | — | — | — | — | — | — | — | — | — |
| | "ARALDITE"GY282 | 40 | 40 | 40 | 40 | 40 | 40 | 40 | 40 | 40 | 40 | 40 | 40 |
| Component [C] | Aromatic amine compound "SEIKACURE"S | 42 | 42 | 42 | 42 | 42 | 42 | 42 | 42 | 42 | 42 | 42 | 42 |
| Component [D] | Particles containing thermoplastic resin as primary component | Number-average particle size | | | | | | | | | | | |
| | Nylon 12 particles SP-10 | 10 μm | — | — | — | — | — | — | — | — | — | — | — | — |
| | Orgasoll1002D NAT1 | 20 μm | — | — | — | — | — | — | — | — | — | — | — | — |
| | Particles A | 13 μm | — | 51.5 | 21.3 | — | 51.5 | 21.3 | — | 51.5 | 21.3 | — | 51.5 | 21.3 |
| | Particles B | 13 μm | — | — | — | — | — | — | — | — | — | — | — | — |
| Component [E] | Conductive particle | Number-average particle size | Volume resistivity | | | | | | | | | | |
| | Conductive particle A | 28 μm | 3.9 × 10⁻² Ωcm | — | 10.4 | 4.3 | — | 10.4 | 4.3 | — | — | — | — | — |
| | "Glassy Carbon" | 26 μm | 4.2 × 10⁻⁵ Ωcm | — | — | — | — | — | — | — | — | — | — | — |
| | "MICRO PEARL" AU225 | 25 μm | 1.4 × 10⁻³ Ωcm | — | — | — | — | — | — | — | — | — | — | — |
| | Conductive particle B | 36 μm | 3.9 × 10⁻² Ωcm | — | — | — | — | — | — | — | 10.4 | 4.3 | — | — |
| | Conductive particle C | 33 μm | 3.9 × 10⁻² Ωcm | — | — | — | — | — | — | — | — | — | — | — |
| | Conductive particle D | 20 μm | 3.9 × 10⁻² Ωcm | — | — | — | — | — | — | — | — | — | — | 10.4 | 4.3 |
| | Conductive particle E | 16 μm | 3.9 × 10⁻² Ωcm | — | — | — | — | — | — | — | — | — | — | — |

TABLE 5-continued

| Component [F] | Carbon black | | | | | | | | | | | |
|---|---|---|---|---|---|---|---|---|---|---|---|---|
| | "Printex"L | — | — | — | — | — | — | — | — | — | — | — |
| | "Printex"L6 | — | 2.4 | — | — | — | — | — | — | — | — | — |
| | "Printex"P | — | — | — | 2.4 | — | — | — | — | — | — | — |
| | ECP600JD | — | — | 2.4 | — | — | — | — | — | — | — | — |
| | #3230B | 2.4 | — | — | — | — | 2.4 | 2.4 | 2.4 | 2.4 | 2.4 | 2.4 |
| Component [G] | Thermoplastice resin having a polyarylether skeleton | | | | | | | | | | | |
| | "VIRANTAGE"VW-10700RFP | 16 | 16 | 16 | 16 | 16 | 16 | 16 | 16 | 16 | 16 | 16 |
| Component [H] | • DISPERBYK-111 | — | — | — | — | — | — | — | — | — | — | — |
| | • DISPERBYK-2155 | — | — | — | — | — | — | — | — | — | — | — |
| Resin characteristics | Structure size (nm) of component [F] in component [B] | 480 | — | — | 140 | — | 160 | — | 180 | — | — | — |
| | Ne/Nd ratio | 0.99 | | | 0.76 | | 1.41 | | 0.81 | | | |
| Zeta-potential | Component [D]mV | 5 | | | 5 | | 5 | | 5 | | | |
| | Component [F]mV | -28 | | | -28 | | -43 | | -43 | | | |
| Prepreg characteristics | Areal weight (g/m²) of component [A] | 192 | | | 192 | | 270 | | 135 | | | |
| | Presence or absence of component [A] in the ranges extending up to 13% of the average thickness of the prepreg from each surface of the prepreg | Absent | | | Absent | | Absent | | Absent | | | |
| | Amount (% by mass) of component [D] present in the ranges corresponding to up to 15% of the average thickness of the prepreg from each surface of the prepreg | 97 | | | 97 | | 97 | | 97 | | | |
| | Amount (% by mass) of component [E] present in the ranges corresponding to up to 15% of the average thickness of the prepreg from each surface of the prepreg | 99 | | | 99 | | 99 | | 99 | | | |
| Characteristics of fiber reinforced composite material | Volume content Vf (% by volume) of carbon fibers | 59 | | | 59 | | 57 | | 57 | | | |
| | Compression after impact CAI (MPa) | 292 | | | 303 | | 295 | | 302 | | | |
| | Volume resistivity (Ohmcm) | 2.1 | | | 2.8 | | 2.4 | | 2.5 | | | |

TABLE 5-continued

| | | Example 33 | | | Example 34 | | | Example 35 | | |
|---|---|---|---|---|---|---|---|---|---|---|
| | | Primary resin | Secondary resin | Total | Primary resin | Secondary resin | Total | Primary resin | Secondary resin | Total |
| Component [A] | Carbon fiber "TORAYCA" T800S-24K-10E | — | — | ○ | — | — | ○ | — | — | ○ |
| Component [B] | Thermosetting resin (polyfunctional epoxy resin) "ARALDITE" MY721 | 60 | 60 | 60 | 60 | 60 | 60 | 60 | 60 | 60 |
| | "jER" 630 Thermosetting resin (epoxy resin having di-functionality) | — | — | — | — | — | — | — | — | — |
| | "ARALDITE" GY282 | 42 | 42 | 42 | 42 | 42 | 42 | 42 | 42 | 42 |
| Component [C] | Aromatic amine compound "SEIKACURE"S | 40 | 40 | 40 | 40 | 40 | 40 | 40 | 40 | 40 |
| Component [D] | Particles containing thermoplastic resin as primary component | | | | | | | | | |
| | Nylon 12 particles SP-10 (Number-average particle size 10 μm) | — | — | — | — | 51.5 | 21.3 | — | — | — |
| | Orgasoll 1002D NAT1 (20 μm) | — | — | — | — | — | — | — | — | — |
| | Particles A (13 μm) | — | 51.5 | 21.3 | — | — | — | — | — | — |
| | Particles B (13 μm) | — | — | — | — | — | — | — | — | — |
| Component [E] | Conductive particle (Number-average particle size / Volume resistivity) | | | | | | | | | |
| | Conductive particle A (28 μm / $3.9 \times 10^{-2}$ Ωcm) | — | — | — | — | — | — | — | — | — |
| | "Glassy Carbon" (26 μm / $4.2 \times 10^{-5}$ Ωcm) | — | — | — | — | — | — | — | — | — |
| | "MICRO PEARL" AU225 (25 μm / $1.4 \times 10^{-3}$ Ωcm) | — | — | — | — | — | — | — | — | — |
| | Conductive particle B (36 μm / $3.9 \times 10^{-2}$ Ωcm) | — | 10.4 | 4.3 | — | — | — | — | — | — |
| | Conductive particle C (33 μm / $3.9 \times 10^{-2}$ Ωcm) | — | — | — | — | — | — | — | — | — |
| | Conductive particle D (20 μm / $3.9 \times 10^{-2}$ Ωcm) | — | — | — | — | 10.4 | 4.3 | — | 10.4 | 4.3 |
| | Conductive particle E (16 μm / $3.9 \times 10^{-2}$ Ωcm) | — | — | — | — | — | — | — | — | — |
| Component [F] | Carbon black | | | | | | | | | |
| | "Printex" L | 2.4 | 2.4 | 2.4 | — | — | — | — | — | — |
| | "Printex" L6 | — | — | — | 2.4 | 2.4 | 2.4 | 2.4 | 2.4 | 2.4 |

TABLE 5-continued

| | | | | | | | | | |
|---|---|---|---|---|---|---|---|---|---|
| Component [G] | "Printex"P ECP600JD #3230B | — | — | — | — | — | — | — | — |
| | Thermoplastice resin having a polyarylether skeleton | 16 | 16 | 16 | 16 | 16 | 16 | 16 | 16 |
| Component [H] | "VIRANTAGE"VW-10700RFP | — | — | — | — | — | — | — | — |
| | • DISPERBYK-111 | — | — | — | — | — | 0.8 | 0.5 | — |
| | • DISPERBYK-2155 | — | — | — | — | — | — | — | 0.5 |
| Resin characteristics | Structure size (nm) of component [F] in component [B] | 180 | — | — | 180 | — | — | 180 | 180 |
| | Ne/Nd ratio | 1.34 | — | — | 2.0 | — | — | 0.65 | 0.91 |
| Zeta-potential | Component [D]mV | 5 | — | — | 40 | — | — | 40 | 40 |
| | Component [F]mV | −43 | — | — | −39 | — | — | −39 | −39 |
| Prepreg characteristics | Areal weight (g/m²) of component [A] | 192 | — | — | 192 | — | — | 192 | 192 |
| | Presence or absence of component [A] in the ranges extending up to 13% of the average thickness of the prepreg from each surface of the prepreg | Absent | — | — | Absent | — | — | Absent | Absent |
| | Amount (% by mass) of component [D] present in the ranges corresponding to up to 15% of the average thickness of the prepreg from each surface of the prepreg | 97 | — | — | 98 | — | — | 97 | 97 |
| | Amount (% by mass) of component [E] present in the ranges corresponding to up to 15% of the average thickness of the prepreg from each surface of the prepreg | 99 | — | — | 99 | — | — | 99 | 99 |
| Characteristics of fiber reinforced composite material | Volume content Vf (% by volume) of carbon fibers | 57 | — | — | 59 | — | — | 59 | 59 |
| | Compression after impact CAI (MPa) | 289 | — | — | 302 | — | — | 301 | 301 |
| | Volume resistivity (Ohmcm) | 2.3 | — | — | 2.4 | — | — | 2.8 | 2.8 |

TABLE 6

| | | | Comparative Example 1 | | | Comparative Example 2 | | | Comparative Example 3 | | | Comparative Example 4 | | |
|---|---|---|---|---|---|---|---|---|---|---|---|---|---|---|
| | | | Primary resin | Secondary resin | Total | Primary resin | Secondary resin | Total | Primary resin | Secondary resin | Total | Primary resin | Secondary resin | Total |
| Component [A] | Carbon fiber | | — | — | ○ | — | — | ○ | — | — | ○ | — | — | ○ |
| Component [B] | Thermosetting resin (polyfunctional epoxy resin) | | | | | | | | | | | | | |
| | "ARALDITE"MY721 | | 60 | 60 | 60 | 60 | 60 | 60 | 60 | 60 | 60 | 60 | 60 | 60 |
| | "jER"630 | | — | — | — | — | — | — | — | — | — | — | — | — |
| | Thermosetting resin (epoxy resin having di-functionality) | | 40 | 40 | 40 | 40 | 40 | 40 | 40 | 40 | 40 | 40 | 40 | 40 |
| Component [C] | "ARALDITE"GY282 | | — | — | — | — | — | — | — | — | — | — | — | — |
| | GAN | | — | — | — | — | — | — | — | — | — | — | — | — |
| | Aromatic amine compound | | 42 | 42 | 42 | 42 | 42 | 42 | 42 | 42 | 42 | 42 | 42 | 42 |
| | "SEIKACURE"S | | | | | | | | | | | | | |
| Component [D] | Particles containing thermoplastic resin as primary component | Number-average particle size | | | | | | | | | | | | |
| | Nylon 12 particles SP-10 | 10 μm | — | — | — | — | — | — | — | — | — | — | — | — |
| | Orgasol1002D NAT1 | 20 μm | — | — | — | — | — | — | — | — | — | — | — | — |
| | Particles A | 13 μm | — | 61 | 27 | — | 61 | 24.5 | — | 61 | 25.3 | — | 51.5 | 21.3 |
| | Particles B | 13 μm | — | — | — | — | — | — | — | — | — | — | — | — |
| Component [E] | Conductive particle | Volume resistivity | | | | | | | | | | | | |
| | Conductive particle A | 28 μm | 3.9 × 10⁻² Ωcm | — | 11.7 | 5.2 | — | 11.7 | 4.7 | — | — | — | — | — | — |
| | "Glassy Carbon" 26 μm | 4.2 × 10⁻⁵ Ωcm | — | — | — | — | — | — | — | — | — | — | — | — |
| | "MICRO PEARL" AU225 | 25 μm | 1.4 × 10⁻³ Ωcm | — | — | — | — | — | — | — | — | — | — | — | — |
| | Conductive particle B | 36 μm | 3.9 × 10⁻² Ωcm | — | — | — | — | — | — | — | — | — | — | — | — |
| | Conductive particle C | 33 μm | 3.9 × 10⁻² Ωcm | — | — | — | — | — | — | — | — | — | — | — | — |
| | Conductive particle D | 20 μm | 3.9 × 10⁻² Ωcm | — | — | — | — | — | — | — | — | — | — | — | — |
| | Conductive particle E | 16 μm | 3.9 × 10⁻² Ωcm | — | — | — | — | — | — | — | — | — | — | 10.4 | 4.3 |

TABLE 6-continued

| | | | | | | | | | | | | | |
|---|---|---|---|---|---|---|---|---|---|---|---|---|---|
| Component [F] | Carbon black | | | | | | | | | | | | |
| | "Printex"L | 2.5 | 2.5 | 2.5 | — | — | — | — | 2.4 | 2.4 | 2.4 | — | — |
| | "Printex"L6 | — | — | — | — | — | — | — | — | — | — | — | — |
| | "Printex"P ECP600JD | — | — | — | — | — | — | — | — | — | — | — | — |
| | #3230B | — | — | — | — | — | — | 2.4 | — | — | — | 2.4 | 2.4 |
| Component [G] | Thermoplastic resin having a polyaryl ether skeleton | | | | | | | | | | | | |
| | "VIRANTAGE"VW-10700RFP | 16 | 16 | 16 | 16 | 16 | 16 | 16 | 16 | 16 | 16 | 16 | 16 |
| Resin characteristics | Structure size (nm) of component [F] in component [B] | 180 | — | — | 180 | — | 180 | — | — | 210 | — |
| | Ne/Nd ratio | — | — | — | — | — | — | — | — | — | 0.76 | |
| Zeta-potential | Component [D]mV | — | 5 | 5 | — | 5 | 5 | — | — | 5 | — |
| | Component [F]mV | -28 | -28 | -28 | -43 | -43 | -43 | — | — | -43 | — |
| Prepreg characteristics | Areal weight (g/m²) of component [A] | 192 | 192 | 192 | 192 | 192 | 192 | — | — | 192 | — |
| | Presence or absence of component [A] in the ranges extending up to 13% of the average thickness of the prepreg from each surface of the prepreg | Absent | Absent | Absent | Absent | Absent | Absent | | | Absent | |
| | Amount (% by mass) of component [D] present in the ranges corresponding to up to 15% of the average thickness of the prepreg from each surface of the prepreg | 98 | 97 | 97 | 97 | 97 | 97 | | | 97 | |
| | Amount (% by mass) of component [E] present in the ranges corresponding to up to 15% of the average thickness of the prepreg from each surface of the prepreg | 99 | 99 | 99 | 99 | 99 | 99 | | | 99 | |
| Characteristics of fiber reinforced composite material | Volume content Vf (% by volume) of carbon fibers | 59 | 57 | 57 | 57 | 57 | 57 | | | 57 | |
| | Compression after impact CAI (MPa) | 148 | 315 | 313 | 293 | | | | | | |
| | Volume resistivity (Ohm·cm) | 3.5 | 47 | 75 | 14.3 | | | | | | |

TABLE 6-continued

|  |  |  |  | Comparative Example 5 | | | Comparative Example 6 | | | Comparative Example 7 | | |
| --- | --- | --- | --- | --- | --- | --- | --- | --- | --- | --- | --- | --- |
|  |  |  |  | Primary resin | Secondary resin | Total | Primary resin | Secondary resin | Total | Primary resin | Secondary resin | Total |
| Component [A] | Carbon fiber | | | ○ | | | ○ | | | ○ | | |
|  | "TORAYCA" T800S-24K-10E | | | | | | | | | | | |
| Component [B] | Thermosetting resin (polyfunctional epoxy resin) | | | | | | | | | | | |
|  | "ARALDITE"MY721 | | | 60 | 60 | 60 | 60 | 60 | 60 | 60 | 60 | 60 |
|  | "jER"630 | | | — | — | — | — | — | — | — | — | — |
|  | Thermosetting resin (epoxy resin having di-functionality) | | | | | | | | | | | |
|  | "ARALDITE"GY282 | | | 40 | 40 | 40 | 40 | 40 | 40 | 40 | 40 | 40 |
|  | GAN | | | — | — | — | — | — | — | — | — | — |
| Component [C] | Aromatic amine compound | | | | | | | | | | | |
|  | "SEIKACURE'S | | | 42 | 42 | 42 | 42 | 42 | 42 | 42 | 42 | 42 |
| Component [D] | Particles containing thermoplastic resin as primary component | Number-average particle size | | | | | | | | | | |
|  | Nylon 12 particles SP-10 | 10 μm | | — | — | — | — | 51.5 | 21.3 | — | 51.5 | 21.3 |
|  | Orgasol1002D NAT1 | 20 μm | | — | 51.5 | 21.3 | — | — | — | — | — | — |
|  | Particles A | 13 μm | | — | — | — | — | — | — | — | — | — |
|  | Particles B | 13 μm | | — | — | — | — | — | — | — | — | — |
| Component [E] | Conductive particle | Number-average particle size | Volume resistivity | | | | | | | | | |
|  | Conductive particle A | 28 μm | $3.9 \times 10^{-2} \Omega cm$ | — | — | — | — | 10.4 | 4.3 | — | 10.4 | 4.3 |
|  | "Glassy Carbon" | 26 μm | $4.2 \times 10^{-5} \Omega cm$ | — | — | — | — | — | — | — | — | — |
|  | "MICRO PEARL" AU225 | 25 μm | $1.4 \times 10^{-3} \Omega cm$ | — | 10.4 | 4.3 | — | — | — | — | — | — |
|  | Conductive particle B | 36 μm | $3.9 \times 10^{-2} \Omega cm$ | — | — | — | — | — | — | — | — | — |
|  | Conductive particle C | 33 μm | $3.9 \times 10^{-2} \Omega cm$ | — | — | — | — | — | — | — | — | — |
|  | Conductive particle D | 20 μm | $3.9 \times 10^{-2} \Omega cm$ | — | — | — | — | — | — | — | — | — |
|  | Conductive particle E | 16 μm | $3.9 \times 10^{-2} \Omega cm$ | — | — | — | — | — | — | — | — | — |

TABLE 6-continued

| | | C1 | C2 | C3 | C4 | C5 | C6 | C7 |
|---|---|---|---|---|---|---|---|---|
| Component [F] | Carbon black | | | | | | | |
| | "Printex"L | 2.4 | — | — | — | — | — | — |
| | "Printex"L6 | — | 2.4 | — | — | — | — | — |
| | "Printex"P | — | — | 2.4 | — | — | — | — |
| | ECP600JD | — | — | — | 2.4 | — | 2.4 | — |
| | #3230B | — | — | — | — | 2.4 | — | 2.4 |
| Component [G] | Thermoplastic resin having a polyarylether skeleton | | | | | | | |
| | "VIRANTAGE"VW-10700RFP | 16 | 16 | 16 | 16 | 16 | 16 | 16 |
| Resin characteristics | Structure size (nm) of component [F] in component [B] | 210 | — | — | — | 180 | — | 240 |
| | Ne/Nd ratio | 1.36 | | | | 0.18 | | 0.20 |
| Zeta-potential | Component [D]mV | 5 | | | | 40 | | 40 |
| | Component [F]mV | −43 | | | | −39 | | −15 |
| Prepreg characteristics | Areal weight (g/m²) of component [A] | 135 | | | | 192 | | 192 |
| | Presence or absence of component [A] in the ranges extending up to 13% of the average thickness of the prepreg from each surface of the prepreg | Absent | | | | Absent | | Absent |
| | Amount (% by mass) of component [D] present in the ranges corresponding to up to 15% of the average thickness of the prepreg from each surface of the prepreg | 97 | | | | 98 | | 98 |
| | Amount (% by mass) of component [E] present in the ranges corresponding to up to 15% of the average thickness of the prepreg from each surface of the prepreg | 99 | | | | 99 | | 99 |
| Characteristics of fiber reinforced composite material | Volume content Vf (% by volume) of carbon fibers | 59 | | | | 57 | | 56 |
| | Compression after impact CAI (MPa) | 184 | | | | 306 | | 303 |
| | Volume resistivity (Ohm·cm) | 1.9 | | | | 5.6 | | 5.8 |

The invention claimed is:

1. A prepreg comprising at least the following components [A] to [F], wherein the ratio Ne/Nd, with Ne being the number of structures of component [F] present in a range of outside 110% of the particle diameter of component [E] and Nd being the number of structures of component [F] present in a range of outside 110% of the particle diameter of component [D], is 0.25 or more, wherein in a range of outside 110% of the particle diameter of component [E] means that component [F] is distributed in an area protruding outside from the circumference of a particle of component [E] by a length of 10% of the diameter of the particle of component [E] where the diameter of the particle of component [E] is taken as 100%, wherein in a range of outside 110% of the particle diameter of component [D] means that component [F] is distributed in an area protruding outside from the circumference of a particle of component [D] by a length of 10% of the diameter of the particle component [D] where the diameter of the particle of component [D] is taken as 100%, and wherein a structure of component [F] has a size within a range of 40 to 500 nm in terms of number-average particle size; and
wherein:
[A]: carbon fibers;
[B]: thermosetting resin;
[C]: hardener;
[D]: particles containing a thermoplastic resin having a primary particle number-average particle size of 5 to 50 μm as a primary component;
[E]: conductive particles different from component [D] and having a primary particle number-average particle size in the range of the following formula (1)

$$[(A \times 0.1)+4] \leq P_{size} \leq [(A \times 0.1)+14] \quad \text{formula (1)};$$

$P_{size}$: a primary particle number-average particle size (μm) of component [E] conductive particles,
A: areal weight of component [A] in the prepreg, wherein A is 135 to 270 g/m²; and
[F]: filler consisting of a carbon material;
wherein at least one of the following formula (2) to formula (4) is satisfied where the zeta-potential of component [D] is expressed by $\zeta d$ and the zeta-potential of component [F] is expressed by $\zeta f$, $$-10 \text{ mV} < \zeta d < 10 \text{ mV} \quad \text{formula (2)},$$

$$-10 \text{ mV} < \zeta f < 10 \text{ mV} \quad \text{formula (3), and}$$

$$\zeta d \times \zeta f > 0 \quad \text{formula (4)};$$

wherein zeta-potential of each of component [D] and component [F] is measured at a voltage of 60 V, at room temperature (23° C.±2° C.) using ethanol as a dispersion medium by using an electrophoretic light scattering photometer, with a sample being prepared so as to have a concentration of 0.1 wt % relative to the dispersion medium and then used as a measurement solution and the measurement being carried out five times and the average value thereof defined as zeta-potential $\zeta$ (mV).

2. The prepreg according to claim 1 further comprising the following component [G],
[G]: thermoplastic resin composed of a polyaryl ether skeleton.

3. The prepreg according to claim 1, wherein component [F] comprises at least one selected from the group consisting of carbon black, carbon nanotube, graphene, fullerene, and carbon nanofiber.

4. The prepreg according to claim 1 containing component [F] in an amount of 0.5 to 15 parts by mass relative to 100 parts by mass of component [B].

5. The prepreg according to claim 1, wherein component [E] is carbon particles.

6. The prepreg according to claim 1 containing component [E] in an amount of 0.5 to 15 parts by mass relative to 100 parts by mass of component [B].

7. The prepreg according to claim 1, wherein the component [D] particles containing a thermoplastic resin are particles containing a polyamide as a primary component.

8. The prepreg according to claim 1 containing component [D] in an amount of 10 to 35 parts by mass relative to 100 parts by mass of component [B].

9. The prepreg according to claim 1 further comprising the following component [H],
[H]: dispersant.

10. A fiber reinforced material produced by heat hardening the prepreg according to claim 1 and having a thickness direction volume resistivity of 6 Ωcm or lower.

* * * * *

UNITED STATES PATENT AND TRADEMARK OFFICE
CERTIFICATE OF CORRECTION

PATENT NO. : 10,597,503 B2
APPLICATION NO. : 15/128583
DATED : March 24, 2020
INVENTOR(S) : Atsuhito Arai et al.

Page 1 of 1

It is certified that error appears in the above-identified patent and that said Letters Patent is hereby corrected as shown below:

On the Title Page

At Item [72], Inventors:

"Atsuhito Arai, Ehime (JP)" should read -- Atsuhito Arai, Iyo-gun, Ehime (JP) --

"Koji Furukawa, Ehime (JP)" should read -- Koji Furukawa, Iyo-gun, Ehime (JP) --

"Naofumi Yamashita, Ehime (JP)" should read -- Naofumi Yamashita, Iyo-gun, Ehime (JP) --

"Shinji Kochi, Ehime (JP)" should read -- Shinji Kochi, Iyo-gun, Ehime (JP) --

"Yumi Kunimitsu, Ehime (JP)" should read -- Yumi Kunimitsu, Iyo-gun, Ehime (JP) --

"Yui Fujioka, Ehime (JP)" should read -- Yui Fujioka, Iyo-gun, Ehime (JP) --

"Hiroshi Taiko, Otsu (JP)" should read -- Hiroshi Taiko, Otsu-shi, Shiga (JP) --

Signed and Sealed this
Eighteenth Day of August, 2020

Andrei Iancu
*Director of the United States Patent and Trademark Office*